United States Patent
Tochio

(10) Patent No.: US 10,742,543 B2
(45) Date of Patent: Aug. 11, 2020

(54) TRANSMISSION APPARATUS AND REDUNDANCY METHOD

(71) Applicant: FUJITSU LIMITED, Kawasaki-shi, Kanagawa (JP)

(72) Inventor: Yuji Tochio, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 83 days.

(21) Appl. No.: 15/993,264

(22) Filed: May 30, 2018

(65) Prior Publication Data

US 2018/0278515 A1  Sep. 27, 2018

Related U.S. Application Data

(62) Division of application No. 14/859,786, filed on Sep. 21, 2015, now Pat. No. 10,009,262.

(30) Foreign Application Priority Data

Oct. 27, 2014 (JP) .................................. 2014-218716

(51) Int. Cl.
*H04L 12/703* (2013.01)
*H04L 12/707* (2013.01)
*H04L 12/715* (2013.01)

(52) U.S. Cl.
CPC .............. *H04L 45/28* (2013.01); *H04L 45/04* (2013.01); *H04L 45/22* (2013.01)

(58) Field of Classification Search
None
See application file for complete search history.

(56) References Cited

U.S. PATENT DOCUMENTS

| 7,342,873 B1 | 3/2008 | Nagarajan |
| 8,724,456 B1 | 5/2014 | Hong et al. |
| 9,391,885 B1 | 7/2016 | Shukla et al. |
| 2008/0159311 A1 | 7/2008 | Martinotti et al. |

(Continued)

FOREIGN PATENT DOCUMENTS

| JP | 2002-57713 | 2/2002 |
| JP | 2005-354592 | 12/2005 |

(Continued)

OTHER PUBLICATIONS

Office Action for U.S. Appl. No. 14/859,786 dated Aug. 30, 2017.

(Continued)

*Primary Examiner* — Alex Skripnikov
(74) *Attorney, Agent, or Firm* — Staas & Halsey LLP

(57) ABSTRACT

A transmission apparatus includes: a switch circuit to hold a first protection path provided for a working path in a first network, a second protection path provided for the working path in a second network, and a bridge path provided between a working apparatus to relay traffic on the working path between the first and second networks and a protection apparatus to relay traffic on the first and second protection paths; and a signal processing unit to, upon reception of a first control signal indicating a failure on the working path from the first network, transmit the first control signal to the working apparatus and control the switch circuit in accordance with a second control signal corresponding to the first control signal received from the working apparatus, wherein the transmission apparatus is the protection apparatus, and is provided on a boundary between the first and second networks.

4 Claims, 19 Drawing Sheets

(56) References Cited

U.S. PATENT DOCUMENTS

| | | |
|---|---|---|
| 2008/0219168 A1 | 9/2008 | Enomoto et al. |
| 2009/0144403 A1 | 6/2009 | Sajassi et al. |
| 2012/0033541 A1 | 2/2012 | Da Silva et al. |

FOREIGN PATENT DOCUMENTS

| | | |
|---|---|---|
| JP | 2008-219690 | 9/2008 |
| JP | 2010-515316 | 5/2010 |
| JP | 2013-535922 | 9/2013 |

OTHER PUBLICATIONS

Office Action for U.S. Appl. No. 14/859,786 dated Nov. 29, 2017.
Notice of Allowance for U.S. Appl. No. 14/859,786 dated Mar. 27, 2018.

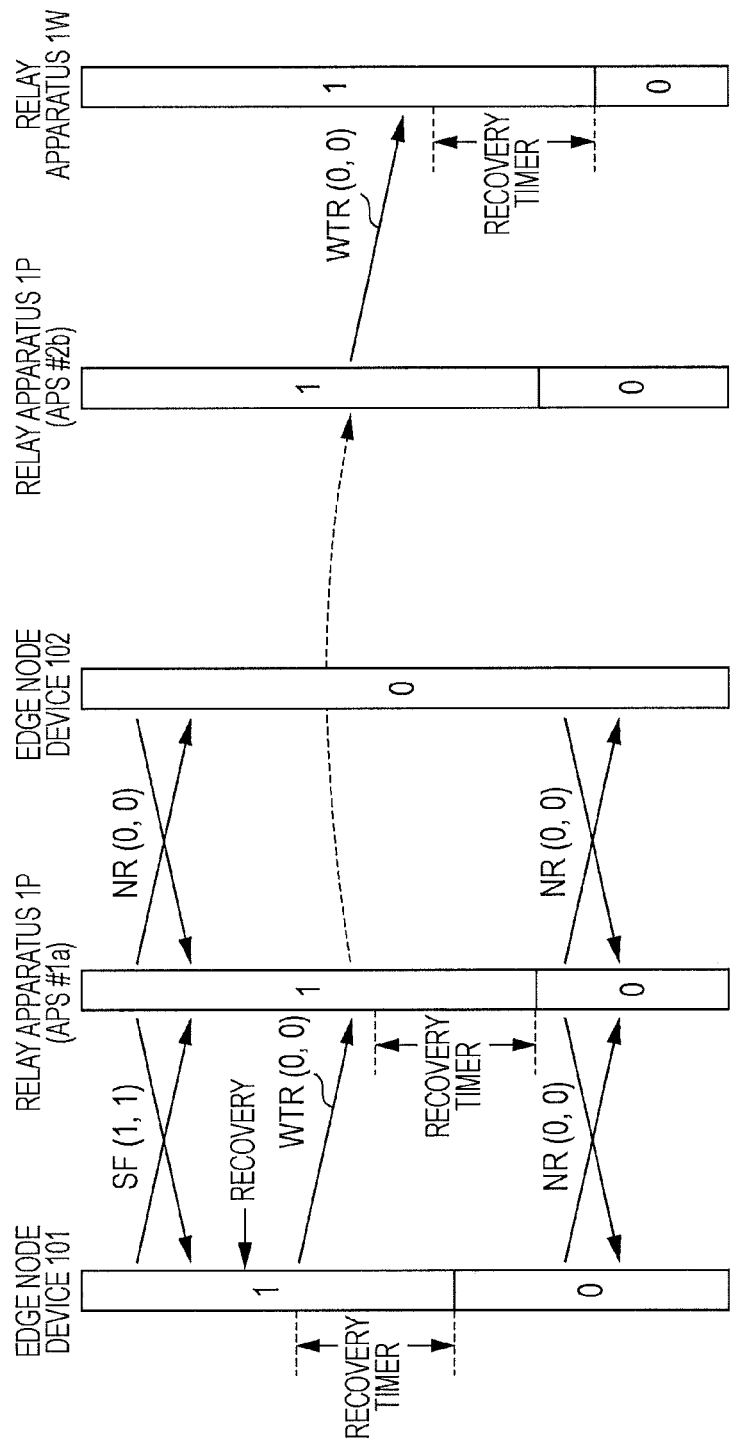

TRANSMISSION APPARATUS AND REDUNDANCY METHOD

CROSS-REFERENCE TO RELATED APPLICATION

This application is a divisional application of U.S. application Ser. No. 14/859,786 filed Sep. 21, 2015, which is based upon and claims the benefit of priority of the prior Japanese Patent Application No. 2014-218716, filed on Oct. 27, 2014, the entire contents of which are incorporated herein by reference.

FIELD

The embodiments discussed herein are related to a transmission apparatus used in a network that provides path redundancy and a redundancy method.

BACKGROUND

Network systems that provide communication services via multiple networks have been in widespread use in recent years. In such a network system, a relay apparatus is provided in a network-network interface (NNI). In addition, configurations that provide redundancy paths have been proposed in order to improve the reliability of networks.

FIG. 1 illustrates an exemplary network system that provides a communication service via multiple networks. In the example in FIG. 1, a network #1 includes an edge node device 101 and a network #2 includes an edge node device 102. A terminal 111 is included in the edge node device 101 and a terminal 112 is included in the edge node device 102. The network #1 is connected to the network #2 via relay apparatuses 121 and 122.

The network system illustrated in FIG. 1 provides path redundancy. The relay apparatus 121 relays the traffic of a working path and the relay apparatus 122 relays the traffic of a protection path. Specifically, in the network #1, a working path WP1 is set between the edge node device 101 and the relay apparatus 121 and a protection path PP1 is set between the edge node device 101 and the relay apparatus 122. In the network #2, a working path WP2 is set between the edge node device 102 and the relay apparatus 121 and a protection path PP2 is set between the edge node device 102 and the relay apparatus 122. When the network system operates normally (that is, when no failure occurs in the network system), the traffic between the terminal 111 and the terminal 112 is transmitted via the working path WP1, the relay apparatus 121, and the working path WP2. When any failure occurs on the working path WP1 or the working path WP2, the traffic between the terminal 111 and the terminal 112 is transmitted via the protection path PP1, the relay apparatus 122, and the protection path PP2.

Related technologies are described in Japanese Laid-open Patent Publication No. 2002-57713, Japanese Laid-open Patent Publication No. 2005-354592, Japanese Laid-open Patent Publication No. 2008-219690, Japanese National Publication of International Patent Application No. 2010-515316, and Japanese National Publication of International Patent Application No. 2013-535922.

SUMMARY

According to an aspect of the invention, a transmission apparatus includes: a switch circuit configured to hold a first protection path provided for a working path in a first network, a second protection path provided for the working path in a second network, and a bridge path provided between a working transmission apparatus to relay traffic on the working path between the first network and the second network and a protection transmission apparatus to relay traffic on the first protection path and the second protection path; and a signal processing unit configured to, upon reception of a first control signal indicating a failure on the working path from the first network, transmit the first control signal to the working transmission apparatus and control the switch circuit in accordance with a second control signal corresponding to the first control signal received from the working transmission apparatus, wherein the transmission apparatus is the protection transmission apparatus, and wherein the transmission apparatus is provided on a boundary between the first network and the second network in a network system including the working transmission apparatus and the protection transmission apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an exemplary path switching sequence when the failure has been recovered;

DESCRIPTION OF EMBODIMENTS

If any failure occurs in a network in a network system that provides a communication service via multiple networks, the remaining networks are preferably not affected by the failure. For example, when the networks that are connected to each other have different domains, it is undesirable that any failure occurring in a domain affect adjacent domains because the path is managed for every network.

Figure 1:
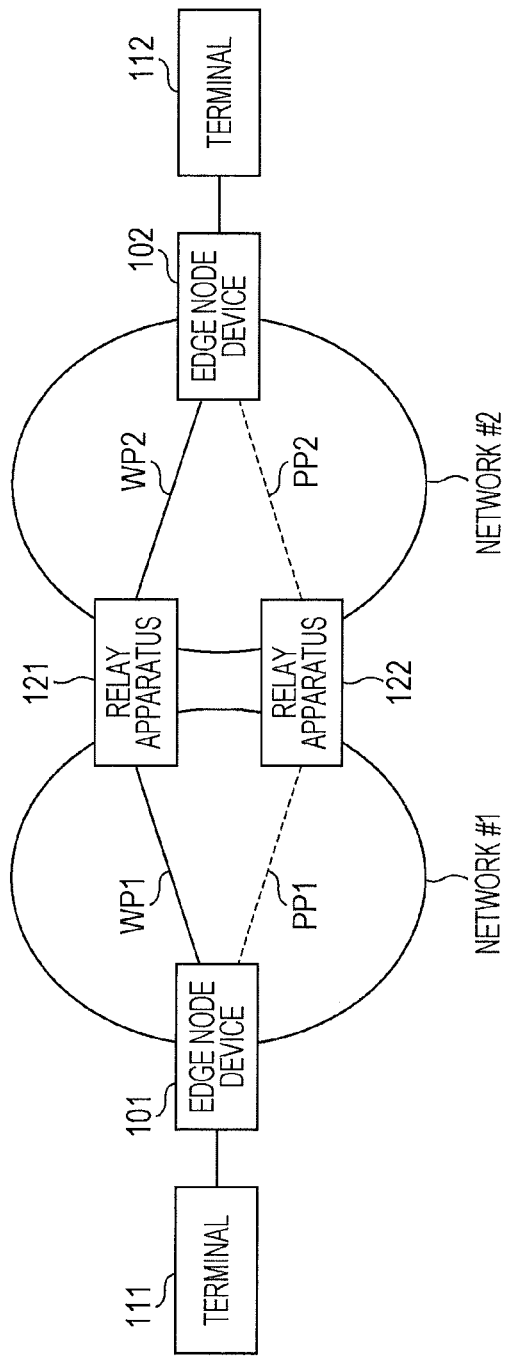
FIG. 1 illustrates an exemplary network system in related art.

However, if any failure occurs in one network in the network system illustrated in FIG. 1, the other network is affected by the failure. For example, if any failure occurs on the working path WP1 in the network #1, the protection path is activated in the following manner:

(1) The edge node device 101 detects the failure on the working path WP1.
(2) The edge node device 101 notifies the relay apparatus 122 of the failure via the protection path PP1.
(3) The relay apparatus 122 notifies the edge node device 102 of the failure via the protection path PP2.
(4) The edge node device 102 switches the path used to transmit the traffic from the working path to the protection path.
(5) The edge node device 102 notifies the relay apparatus 122 of the switching of the path via the protection path PP2.
(6) The relay apparatus 122 sets a path used to transmit the traffic.
(7) The relay apparatus 122 notifies the edge node device 101 of the switching of the path via the protection path PP1.
(8) The edge node device 101 switches the path used to transmit the traffic from the working path to the protection path.

In the above example, various messages are transmitted in the network #2 in the above manner if any failure occurs in the network #1 despite the fact that no failure occurs in the network #2. In addition, a transmission route of the traffic is changed not only in the network #1 but also in the network #2.

Technologies to inhibit the remaining networks from being affected by a failure occurring in a network in a network system including multiple networks will herein be described with reference to the attached drawings.

First Embodiment

Figure 2:
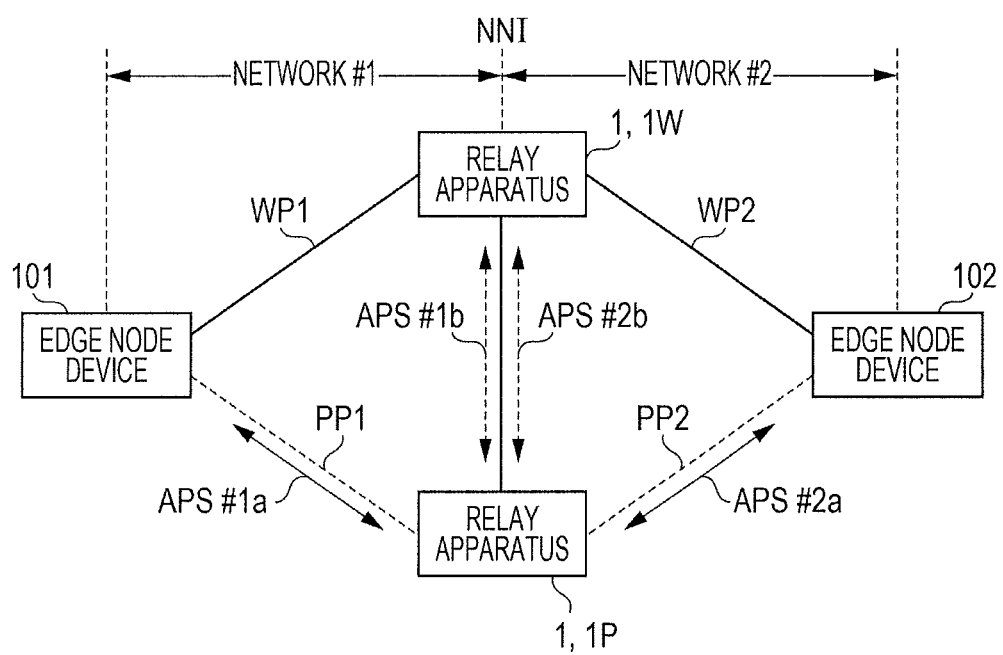
FIG. 2 illustrates an exemplary network system according to a first embodiment.

FIG. 2 illustrates an exemplary network system according to a first embodiment. The network system illustrated in FIG. 2 includes a network #1 and a network #2. The network #1 includes an edge node device 101. The edge node device 101 is capable of housing a client terminal. Similarly, the network #2 includes an edge node device 102. The edge node device 102 is also capable of housing a client terminal.

Relay apparatuses 1W and 1P are provided on the boundary between the network #1 and the network #2. The relay apparatuses 1W and 1P are collectively called a relay apparatus 1. The relay apparatuses 1W and 1P provide dual homing (or dual node interconnect (DNI)).

The relay apparatus 1W is provided on a working path set between the edge node devices 101 and 102. In other words, the relay apparatus 1W relays the traffic between the edge node devices 101 and 102. The working path is composed of a working path WP1 set between the edge node device 101 and the relay apparatus 1W in the network #1 and a working path WP2 set between the edge node device 102 and the relay apparatus 1W in the network #2.

The protection paths corresponding to the above working paths pass through the relay apparatus 1P. Specifically, a protection path PP1 corresponding to the working path WP1 is set between the edge node device 101 and the relay apparatus 1P in the network #1. A protection path PP2 corresponding to the working path WP2 is set between the edge node device 102 and the relay apparatus 1P in the network #2. The relay apparatus 1W is connected to the relay apparatus 1P via a physical link.

The edge node devices 101 and 102 and the relay apparatuses 1W and 1P are examples of a transmission apparatus. One or more transmission apparatuses may be provided on each of the working path WP1, the working path WP2, the protection path PP1, and the protection path PP2.

In the network system having the above configuration, the traffic between the edge node devices 101 and 102 is transmitted via the working paths WP1 and WP2. However, if a failure occurs on the working path or in the relay apparatus 1W, the traffic is transmitted using the protection paths. In other words, if a failure occurs in a working system, the switching from the working path to the protection path is performed in at least part of the section. A path switching function is realized using Automatic Protection Switching (APS) in the embodiments. The APS is described in International Telecommunication Union Telecommunication Standardization Sector (ITU-T) G. 8031.

An APS process is performed on the protection path for every network. Accordingly, in the network system illustrated in FIG. 2, an APS process (APS #1a) is performed on the protection path PP1 set between the edge node device 101 and the relay apparatus 1P. The APS #1a is realized by installing a program (hereinafter referred to as an APS program) that provides the APS function in the edge node device 101 and the relay apparatus 1P. Similarly, an APS process (APS #2a) is performed on the protection path PP2 set between the edge node device 102 and the relay apparatus 1P. The APS #2a is realized by installing the APS program in the edge node device 102 and the relay apparatus 1P.

In addition, APS processes (APS #1b and APS #2b) are performed between the relay apparatuses 1W and 1P, if desired. The APS #1b is realized by installing the APS program in the relay apparatuses 1W and 1P and operates in subordination to the APS #2a. The APS #2b is realized by installing the APS program in the relay apparatuses 1W and 1P and operates in subordination to the APS #1a.

Figure 3A:
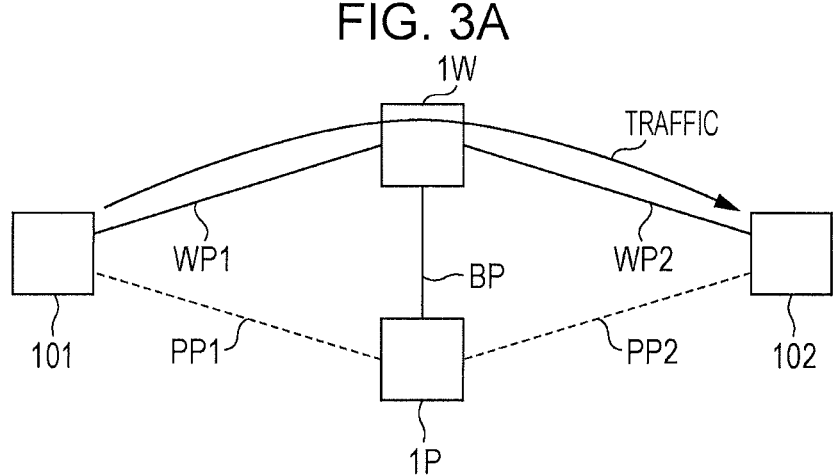
FIGS. 3A to 3C illustrate an example of path switching according to the first embodiment.
Figure 3B:
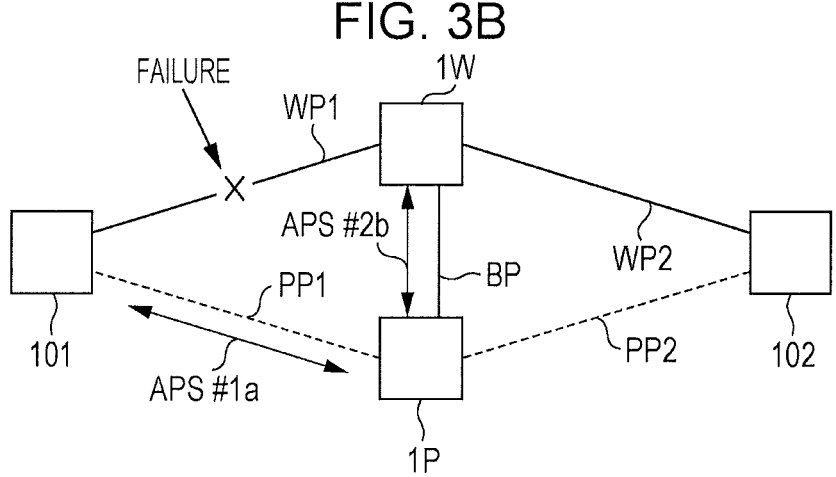
Figure 3C:
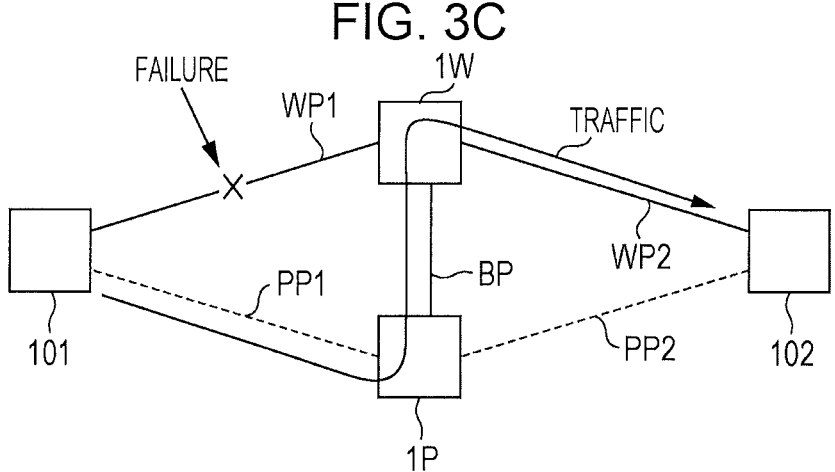

FIGS. 3A to 3C illustrate an example of path switching according to the first embodiment. It is assumed here that the traffic between the edge node devices 101 and 102 is transmitted via the working paths WP1 and WP2, as illustrated in FIG. 3A. It is assumed that a failure occurs on the working path WP1, as illustrated in FIG. 3B. In this case, the failure on the working path WP1 is detected by the edge node device 101. It is assumed in the following description that a bridge path BP is set on the physical link between the relay apparatuses 1W and 1P.

Upon detection of the failure on the working path WP1 by the edge node device 101, the failure is indicated to the relay apparatus 1P through the APS #1a. The APS #2b subordinate to the APS #1a is started in the relay apparatus 1P and the failure is indicated to the relay apparatus 1W through the APS #2b.

In the relay apparatus 1W, the working path WP2 is connected to the bridge path BP through the APS #2b. The path switching in the relay apparatus 1W is indicated to the relay apparatus 1P through the APS #2b. In the relay apparatus 1P, the protection path PP1 is connected to the bridge path BP through the APS #2b. Alternatively, in the relay apparatus 1P, the protection path PP1 may be connected to the bridge path BP through the APS #1a. The path switching in the relay apparatus 1P is indicated to the edge node device 101 through the APS #1a. The switching from the working path WP1 to the protection path PP1 is performed through the APS #1a in the edge node device 101. As a result, the traffic between the edge node devices 101 and 102 is transmitted via the protection path PP1, the bridge path BP, and the working path WP2, as illustrated in FIG. 3C.

As described above, in the example illustrated in FIG. 3A to FIG. 3C, upon occurrence e of a failure in the network #1, a control signal or a message related to the failure is not transmitted in the network #2. In addition, the route on which the traffic flows in the network #2 is not changed even if the failure occurs in the network #1. In other words, the network #2 is not affected by a failure even if the failure occurs in the network #1.

Figure 4:
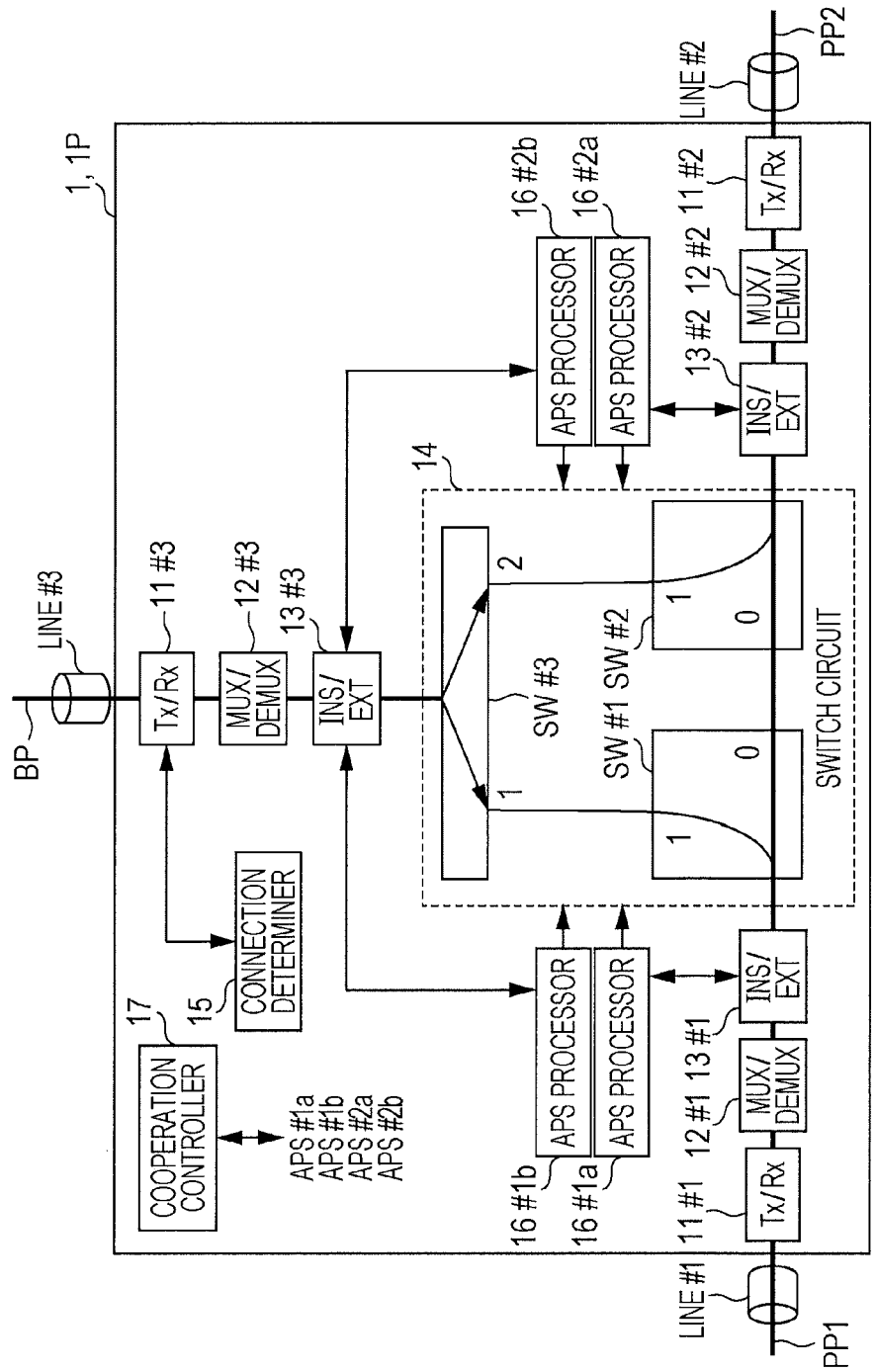
FIG. 4 illustrates an exemplary relay apparatus according to the first embodiment.

FIG. 4 illustrates an exemplary relay apparatus according to the first embodiment. It is assumed in the following description that the relay apparatus 1 is the relay apparatus 1P illustrated in FIG. 2 or FIGS. 3A to 3C. However, the configuration of the relay apparatus 1W used in the working system is substantially the same as that of the relay apparatus 1P used in a protection system.

The relay apparatus 1 includes a transmitter-receiver (Tx/Rx) 11#1, a transmitter-receiver (Tx/Rx) 11#2, and a transmitter-receiver (Tx/Rx) 11#3; a multiplexer-demultiplexer (MUX/DEMUX) 12#1, a multiplexer-demultiplexer (MUX/DEMUX) 12#2, and a multiplexer-demultiplexer (MUX/DEMUX) 12#3; an inserting-extracting unit (INS/EXT) 13#1, an inserting-extracting unit (INS/EXT) 13#2, and an inserting-extracting unit (INS/EXT) 13#3; a switch circuit 14; a connection determiner 15; APS processors 16#1a, 16#1b, 16#2a, and 16#2b; and a cooperation controller 17. When multiple virtual local area networks (LANs) are set in the network system, the relay apparatus 1 may include multiple sets of the inserting-extracting units 13#1 to 13#3, multiple switch circuits 14, multiples sets of the APS processors 16#1a, 16#1b, 16#2a, and 16#2b, and multiple cooperation controllers 17. The relay apparatus 1 has lines #1 to #3. The protection path PP1 illustrated in FIG. 2 or FIGS. 3A to 3C is set on the line #1. The protection path PP2 illustrated in FIG. 2 or FIGS. 3A to 3C is set on the line #2. The bridge path BP illustrated in FIGS. 3A to 3C is set on the line #3.

The transmitter-receiver 11#1 receives a signal from the line #1 and transmits a signal to the line #1. The multiplexer-demultiplexer 12#1 demultiplexes the signals received by the transmitter-receiver 11#1 for every virtual LAN. In addition, the multiplexer-demultiplexer 12#1 multiplexes the signals in the respective virtual LANs, which are to be transmitted to the line #1. The following description focuses on one virtual LAN. The inserting-extracting unit 13#1 extracts an APS message from the signal received by the transmitter-receiver 11#1 and passes the APS message to the APS processor 16#1a. In addition, the inserting-extracting unit 13#1 inserts an APS message generated by the APS processor 16#1a into the signal, which are to be transmitted to the line #1.

The operations of the transmitter-receiver 11#2, the multiplexer-demultiplexer 12#2, and the inserting-extracting unit 13#2 are substantially the same as those of the transmitter-receiver 11#1, the multiplexer-demultiplexer 12#1, and the inserting-extracting unit 13#1. Specifically, the transmitter-receiver 11#2 receives a signal from the line #2 and transmits a signal to the line #2. The multiplexer-demultiplexer 12#2 demultiplexes the signals received by the transmitter-receiver 11#2 for every virtual LAN. In addition, the multiplexer-demultiplexer 12#2 multiplexes the signals in the respective virtual LANs, which are to be transmitted to the line #2. The inserting-extracting unit 13#2 extracts an APS message from the signal received by the transmitter-receiver 11#2 and passes the APS message to the APS processor 16#2a. In addition, the inserting-extracting unit 13#2 inserts an APS message generated by the APS processor 16#2a into the signal to be transmitted to the line #2.

The operations of the transmitter-receiver 11#3, the multiplexer-demultiplexer 12#3, and the inserting-extracting unit 13#3 are substantially the same as those of the transmitter-receiver 11#1, the multiplexer-demultiplexer 12#1, and the inserting-extracting unit 13#1. Specifically, the transmitter-receiver 11#3 receives a signal from the line #3 and transmits a signal to the line #3. The multiplexer-demultiplexer 12#3 demultiplexes the signals received by the transmitter-receiver 11#3 for every virtual LAN. In addition, the multiplexer-demultiplexer 12#3 multiplexes the signals in the respective virtual LANs, which are to be transmitted to the line #3. The inserting-extracting unit 13#3 extracts an APS message from the signal received by the transmitter-receiver 11#3 and passes the APS message to the APS processor 16#1b or the APS processor 16#2b. In addition, the inserting-extracting unit 13#3 inserts an APS message generated by the APS processor 16#1b or the APS processor 16#2b into the signal to be transmitted to the line #3.

The switch circuit 14 holds the protection path PP1, the protection path PP2, and the bridge path BP. The switch circuit 14 includes switches SW #1 to SW #3 and selectively connects the protection path PP1, the protection path PP2, or the bridge path BP to the switches SW #1 to SW #3. The switch SW #1 connects the protection path PP1 to the switch SW #2 or the switch SW #3 depending on a specified operation state. The switch SW #2 connects the protection path PP2 to the switch SW #1 or the switch SW #3 depending on a specified operation state. The switch SW #3 leads the signal received through the line #3 to the switch SW #1 or the switch SW #2 depending on a specified operation state. The switch SW #3 is capable of leading the signal received through the line #1 and the signal received through the line #2 to the line #3.

The connection determiner 15 determines whether the relay apparatus 1 has the line #3. Alternatively, the connection determiner 15 determines whether the bridge path BP is set on the line #3. If the relay apparatus 1 does not have the line #3 or the bridge path BP is not set on the line #3, the connection determiner 15 changes the settings of the switch SW #1 and the switch SW #2. However, it is assumed in the first embodiment that the relay apparatus 1 has the line #3 and the bridge path BP is set on the line #3.

Each of the APS processors 16#1a, 16#1b, 16#2a, and 16#2b is realized by a processor that executes the APS program. The APS program describes the APS process. In this case, each of the APS processors 16#1a, 16#1b, 16#2a, and 16#2b may be realized by one processor or may be realized by multiple processors. Alternatively, part of the function of each of the APS processors 16#1a, 16#1b, 16#2a, and 16#2b may be realized by a hardware circuit.

The APS process includes a step of transmitting a signal (for example, a Signal Fail (SF) message described below) representing a failure on the working path to a destination apparatus upon detection of the failure. The APS process also includes a step of returning a signal (for example, a Reverse Request (RR) message described below) requesting the operation state to the destination apparatus.

The APS processor 16#1a provides the APS function by transmitting and receiving a message to and from an APS processor provided in the transmission apparatus (the edge node device 101 in the example illustrated in FIG. 2) positioned at the end portion of the protection path PP1. The APS processor 16#2a provides the APS function by transmitting and receiving a message to and from an APS processor provided in the transmission apparatus (the edge node device 102 in the example illustrated in FIG. 2) positioned at the end portion of the protection path PP2.

The APS processor 16#1b and the APS processor 16#2b each provide the APS function by transmitting and receiving a message to and from an APS processor provided in the transmission apparatus (the relay apparatus 1W in the example illustrated in FIG. 2) positioned at the end portion of the bridge path BP. However, the APS processor 16#1b operates in subordination to the APS processor 16#2a under the control of the cooperation controller 17. The APS processors 16#2a and 16#1b are capable of controlling the switch SW #2 and the switch SW #3 in the switch circuit 14 in accordance with the APS process. In contrast, the APS processor 16#2b operates in subordination to the APS processor 16#1a under the control of the cooperation controller 17. The APS processors 16#1a and 16#2b are capable of controlling the switch SW #1 and the switch SW #3 in the switch circuit 14 in accordance with the APS process.

The cooperation controller 17 is capable of causing the APS processors 16#1a, 16#1b, 16#2a, and 16#2b to cooperate with each other. At this time, the cooperation controller 17 causes the APS processors 16#1a, 16#1b, 16#2a, and 16#2b to cooperate with each other depending on the received APS message and the state of the relay apparatus 1P.

Figure 5:
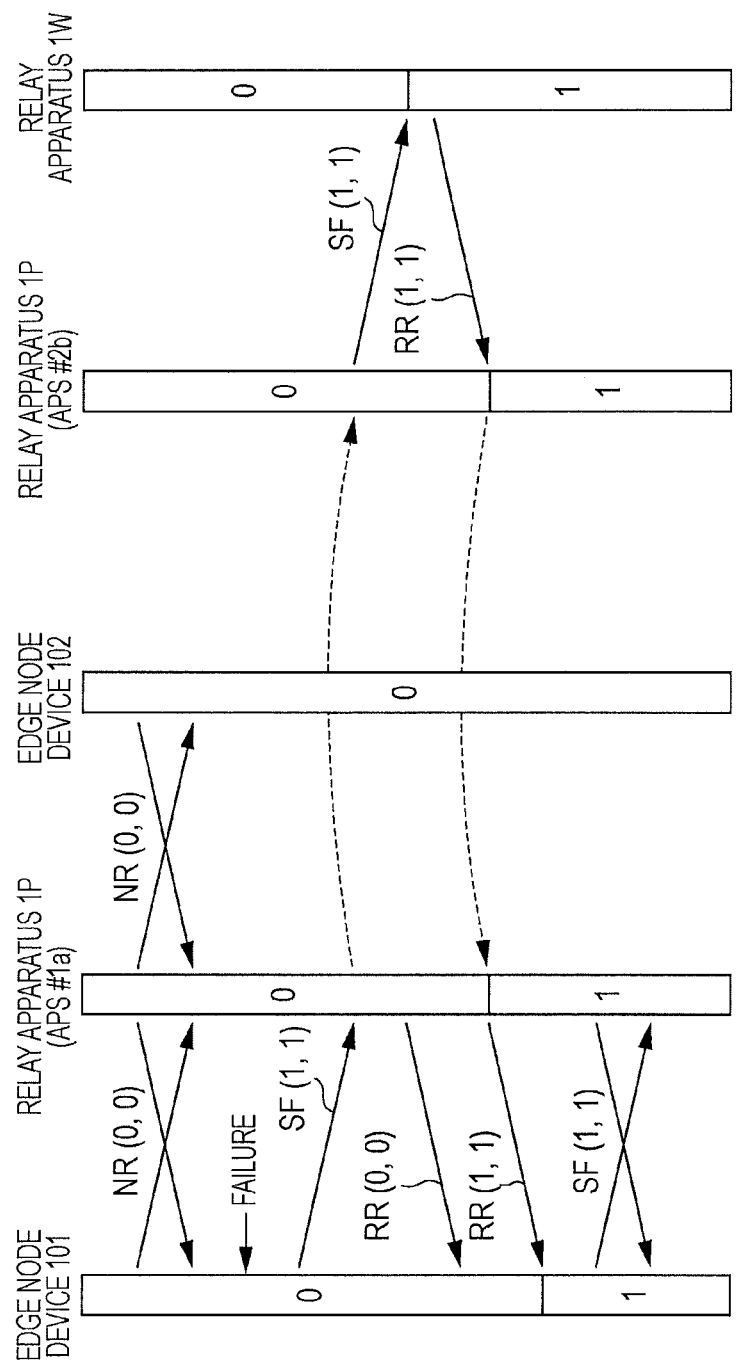
FIG. 5 illustrates an exemplary path switching sequence upon occurrence of a failure.

FIG. 5 illustrates an exemplary path switching sequence upon occurrence of a failure. It is assumed here that the failure occurs on the working path WP1 between the edge node device 101 and the relay apparatus 1W, as illustrated in FIG. 3B. Referring to FIG. 5, two figures (i, j) added to each message indicates the states of the transmission apparatus: i indicates the state requested to the destination of the message and j indicates the state of the own apparatus or device. For example, an RR message (1, 1) to be transmitted from the relay apparatus 1P to the edge node device 101 indicates that "a state 1 is requested to the edge node device 101" and "the relay apparatus 1P operates in the state 1".

Before the failure on the working path WP1 occurs, a No Request (NR) message is transmitted from the edge node device 101 to the relay apparatus 1P and an NR message is transmitted from the relay apparatus 1P to the edge node device 101. The APS process between the edge node device 101 and the relay apparatus 1P is performed by the APS processor in the edge node device 101 and the APS processor 16#1a in the relay apparatus 1P.

Similarly, an NR message is transmitted from the edge node device 102 to the relay apparatus 1P and an NR message is transmitted from the relay apparatus 1P to the edge node device 102. The APS process between the edge node device 102 and the relay apparatus 1P is performed by the APS processor in the edge node device 102 and the APS processor 16#2a in the relay apparatus 1P. At this time, the APS processor 16#1a operates independently of the APS processor 16#2a. Specifically, the APS process between the edge node device 101 and the relay apparatus 1P is performed independently of the APS process between the edge node device 102 and the relay apparatus 1P.

Upon occurrence of the failure on the working path WP1, the APS processor in the edge node device 101 detects the failure. The edge node device 101 transmits the SF message to the relay apparatus 1P in order to notify the relay apparatus 1P of the failure.

In the relay apparatus 1P, the APS processor 16#1a receives the SF message transmitted from the edge node device 101. The APS processor 16#1a notifies the cooperation controller 17 of the reception of the SF message.

Figure 6:
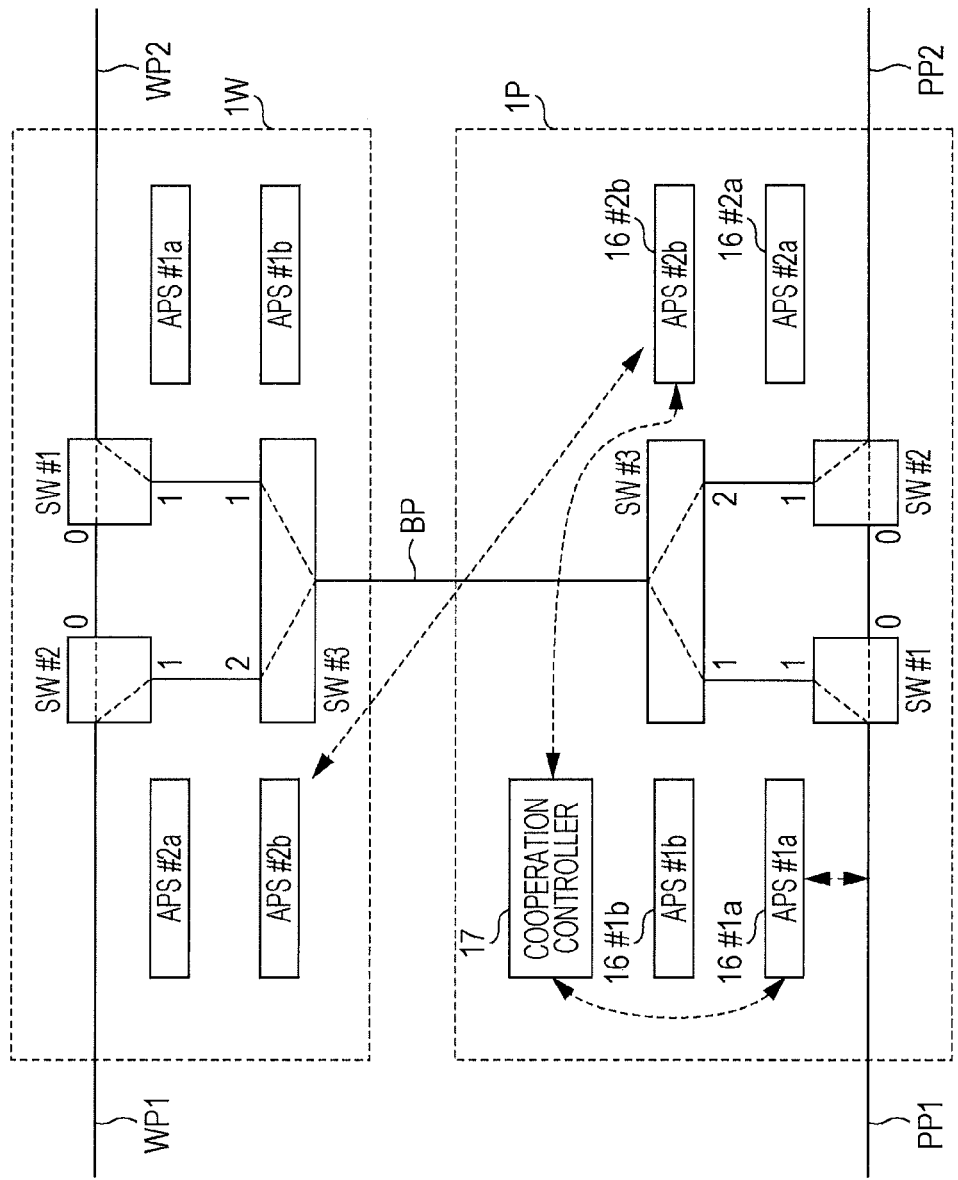
FIG. 6 illustrates an example of how APS processors cooperate with each other.

FIG. 6 illustrates an example of how the APS processors cooperate with each other. Upon reception of the SF message by the APS processor 16#1a, the cooperation controller 17 invokes the APS processor determined based on the state of the relay apparatus 1P. In the first embodiment, the relay apparatus 1P is connected to the relay apparatus 1W via the line #3. In this case, the cooperation controller 17 invokes the APS processor 16#2b subordinate to the APS processor 16#1a. The cooperation controller 17 passes the SF message received by the APS processor 16#1a to the APS processor 16#2b. When the relay apparatus 1P is not connected to the relay apparatus 1W, the cooperation controller 17 causes the APS processor 16#1a and the APS processor 16#2a to cooperate with each other, as described below in a second embodiment.

The APS processor 16#2b performs the APS process with the APS processor in the relay apparatus 1W. It is assumed here that the configuration of the relay apparatus 1W is substantially the same as that of the relay apparatus 1P. In this case, the APS processor 16#2b in the relay apparatus 1P performs the APS process with the APS processor 16#2b in the relay apparatus 1W, as illustrated in FIG. 6.

The APS processor 16#2b in the relay apparatus 1P transmits the SF message to the relay apparatus 1W, as illustrated in FIG. 5. The relay apparatus 1W switches the operation state of the relay apparatus 1W from "0: Working" to "1: Protection" in response to the SF message. Then, the relay apparatus 1W transmits the RR message to the relay apparatus 1P. This RR message includes information requesting the "state 1" from the relay apparatus 1P.

In The relay apparatus 1P, the APS processor 16#2b, which has received the RR message, switches the operation state of the relay apparatus 1P from "0" to "1". The APS processor 16#2b notifies the cooperation controller 17 of the reception of the RR message from the relay apparatus 1W. The cooperation controller 17 passes the RR message received by the APS processor 16#2b to the APS processor 16#1a.

As described above, upon reception of the SF message representing the failure on the working path WP1 from the network #1 by the APS processor 16#1a, the APS process performed between the relay apparatus 1W and the relay apparatus 1P is invoked. The operation states of the relay apparatus 1W and the relay apparatus 1P are controlled through the APS process performed between the relay apparatus 1W and the relay apparatus 1P.

The APS processor 16#1a transmits the RR message to the edge node device 101. The edge node device 101 switches the operation state of the edge node device 101 from "0" to "1" in response to the RR message. In other words, after the operation state of the relay apparatus 1P is switched, the operation state of the edge node device 101 is controlled through the APS process performed between the relay apparatus 1P and the edge node device 101. Then, the SF message is transmitted from the edge node device 101 to the relay apparatus 1P and the SF message is transmitted from the relay apparatus 1P to the edge node device 101.

The NR message is transmitted from the edge node device 102 to the relay apparatus 1P and the NR message is transmitted from the relay apparatus 1P to the edge node device 102 even after the failure has been detected. In other words, the APS messages transmitted between the edge node device 102 and the relay apparatus 1P are the same as those transmitted between the edge node device 102 and the relay apparatus 1P before the failure occurs. As described above, upon occurrence of a failure in the network #1, the network #2 is not affected by the failure.

In the sequence illustrated in FIG. 5, the relay apparatus 1W switches the operation state of the relay apparatus 1W in response to the SF message received from the relay apparatus 1P. At this time, the relay apparatus 1W switches the state of the switch connected to the network where no failure occurs. In the example in FIG. 5, the failure occurs on the working path WP1 in the network #1. Accordingly, in the relay apparatus 1W, the state of the switch SW #1 connected to the network #2 is switched from "0" to "1". Specifically, the working path WP2 set in the network #2 is connected to the bridge path BP connected between the relay apparatus 1W and the relay apparatus 1P.

The relay apparatus 1P switches the operation state of the relay apparatus 1P in response to the RR message received from the relay apparatus 1W. At this time, the relay apparatus 1P switches the state of the switch connected to the network where the failure has occurred. In the example illustrated in FIG. 5, the failure occurs on the working path WP1 in the network #1. Accordingly, in the relay apparatus 1P, the state of the switch SW #1 connected to the network #1 is switched from "0" to "1". Specifically, the protection path PP1 set in the network #1 is connected to the bridge path BP connected between the relay apparatus 1W and the relay apparatus 1P. As a result, the protection path PP1 is connected to the working path WP2 via the bridge path BP.

Figure 7B:
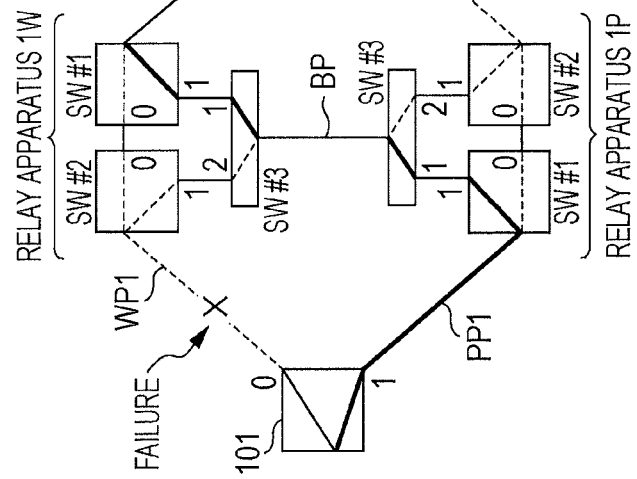
FIGS. 7A and 7B illustrate an example of the path switching.
Figure 7A:
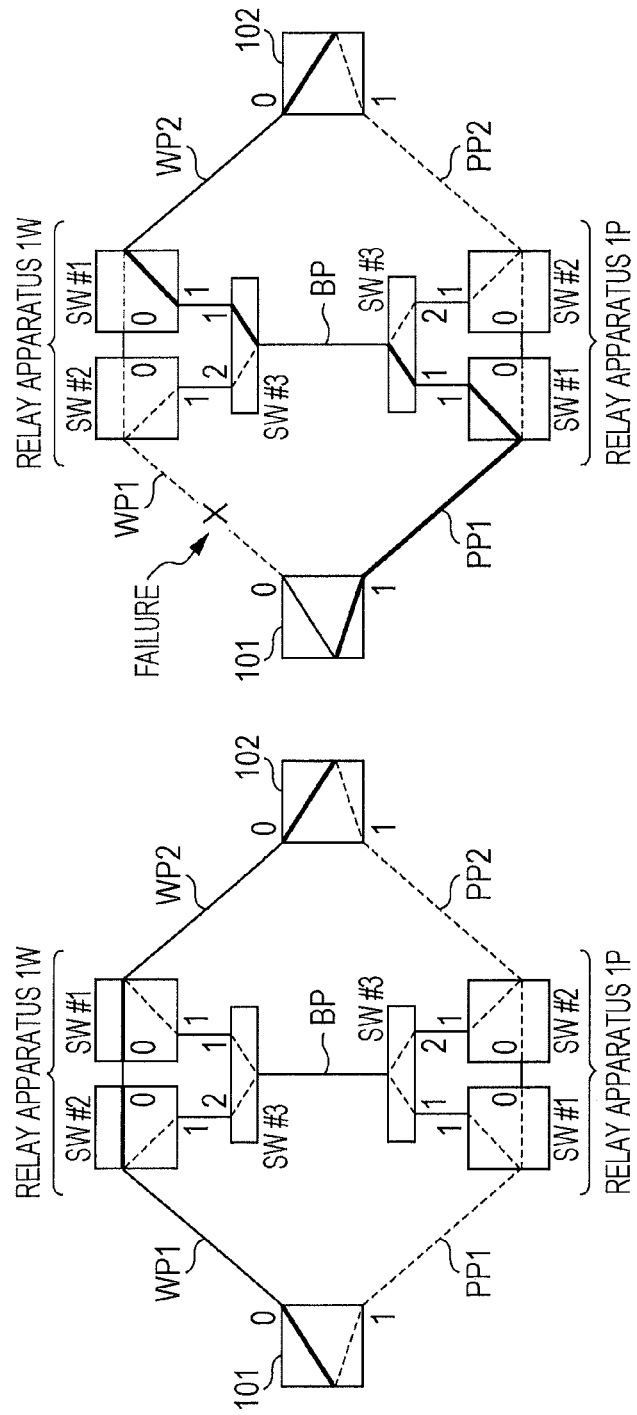

FIGS. 7A and 7B illustrate an example of the path switching. FIG. 7A illustrates the transmission route of the traffic when no failure occurs. When no failure occurs, the operation states of the edge node devices 101 and 102 are set to "0". In each of the relay apparatuses 1W and 1P, the states of the switch SW #1 and the switch SW #2 are set to "0". In this case, the traffic between the edge node devices 101 and 102 is transmitted via the working path WP1 and the working path WP2.

FIG. 7B illustrates the transmission route of the traffic when a failure occurs on the working path WP1 in the network #1. Upon occurrence of the failure on the working path WP1, the state of the switch SW #1 in the relay apparatus 1P is switched from "0" to "1" and the state of the switch SW #1 in the relay apparatus 1W is switched from "0" to "1" through the APS process described above with reference to FIG. 5 to FIG. 6. At this time, in each of the relay apparatuses 1W and 1P, the switch SW #3 is controlled so that the signal on a port #1 is selected. As a result, the traffic between the edge node devices 101 and 102 is transmitted via the protection path PP1, the bridge path BP, and the working path WP2.

Although the APS processor 16#2b switches the state of the switch SW #1 upon reception of the RR message from the relay apparatus 1W by the relay apparatus 1P in the above embodiment, the present disclosure is not limited to this method. For example, the APS processor 16#1a cooperating with the APS processor 16#2b may switch the state of the switch SW #1 upon reception of the RR message from the relay apparatus 1W by the relay apparatus 1P.

FIG. 8 illustrates an exemplary path switching sequence when the failure has been recovered. It is assumed here that the failure on the working path WP1 has been recovered after the sequence illustrated in FIG. 5.

Upon recovery of the failure on the working path WP1, the APS processor in the edge node device 101 detects the recovery. The edge node device 101 transmits a Wait to Restore (WTR) message to the relay apparatus 1P in order to notify the relay apparatus 1P of the recovery. The edge node device 101 starts a recovery timer. Upon expiration of the recovery timer, the operation state of the edge node device 101 is returned from "1" to "0".

In the relay apparatus 1P, the APS processor 16#1a receives the WTR message transmitted from the edge node device 101. The APS processor 16#1a notifies the cooperation controller 17 of the reception of the WTR message. The APS processor 16#1a starts the recovery timer. Upon expiration of the recovery timer, the operation state of the relay apparatus 1P is returned from "1" to "0". At this time, the APS processor 16#1a switches the state of the switch SW #1 in the switch circuit 14 from "1" to "0".

The cooperation controller 17 invokes the APS processor 16#2b subordinate to the APS processor 16#1a, as illustrated in FIG. 8. The cooperation controller 17 passes the WTR message received by the APS processor 16#1a to the APS processor 16#2b. The APS processor 16#2b transmits the WTR message to the relay apparatus 1W. Upon reception of the WTR message, the relay apparatus 1W starts the recovery timer. Upon expiration of the recovery timer, the operation state of the relay apparatus 1W is returned from "1" to "0". As a result, the traffic between the edge node devices 101 and 102 is transmitted via the working path WP1 and the working path WP2, as illustrated in FIG. 7A.

Upon occurrence of a failure on the working path WP2 after the failure on the working path WP1 has occurred, the redundancy is defined in the following manner. Specifically, upon occurrence of the failure on the working path WP1, the APS processor 16#1a cooperates with the APS processor 16#2b, as illustrated in FIG. 6, and the redundancy path illustrated in FIG. 7B is provided. Then, upon occurrence of the failure on the working path WP2, the SF signal is transmitted from the edge node device 102 to the relay apparatus 1P. At this time, the relay apparatus 1P leads the traffic on the protection path PP1 to the bridge path BP. In this case, the cooperation controller 17 in the relay apparatus 1P breaks off the cooperation between the APS processor 16#1a and the APS processor 16#2b and causes the APS processor 16#1a and the APS processor 16#2a to cooperate with each other. The APS processor 16#1a and the APS processor 16#2a set the states of the switch SW #1 and the switch SW #2 to "0". As a result, the traffic between the edge node devices 101 and 102 is transmitted via the protection path PP1 and the protection path PP2.

Second to Fourth Embodiments

Figure 9A:
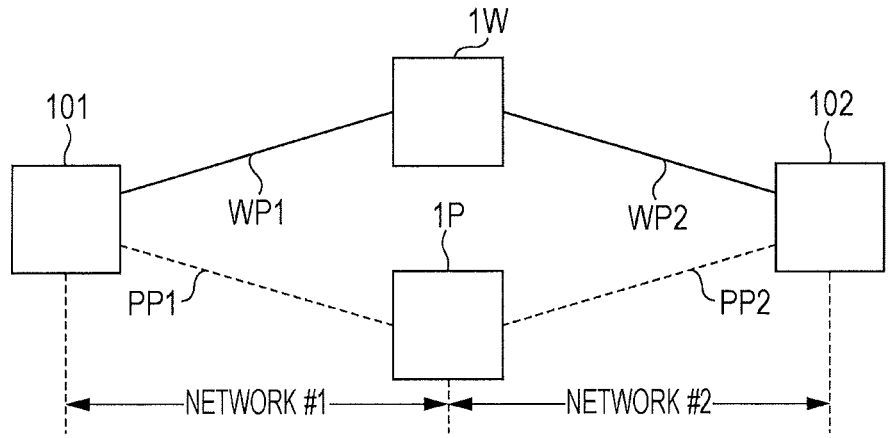
FIGS. 9A to 9C illustrate exemplary network systems according to other embodiments.
Figure 9B:
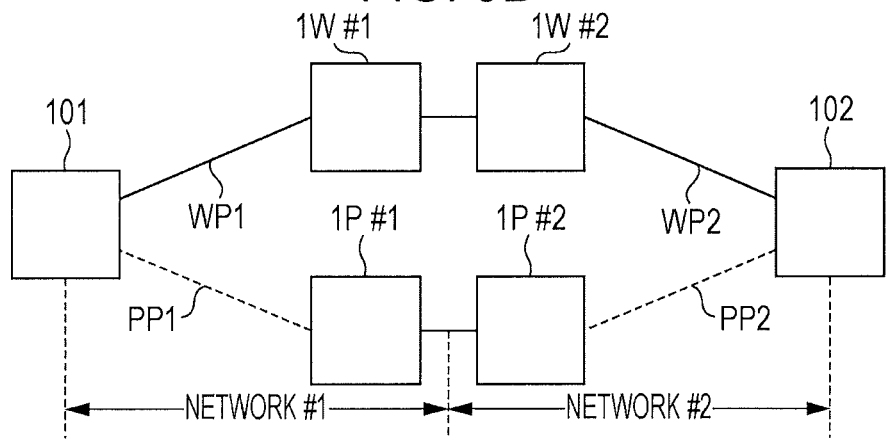
Figure 9C:
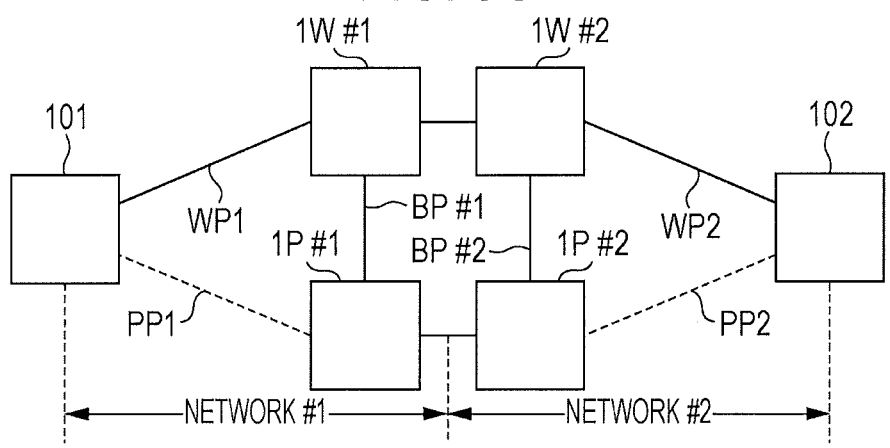

FIGS. 9A to 9C illustrate exemplary network systems according to other embodiments. In a second embodiment illustrated in FIG. 9A, the relay apparatus 1W holds the working path WP1 in the network #1 and the working path WP2 in the network #2, and the relay apparatus 1P holds the protection path PP1 in the network #1 and the protection path PP2 in the network #2. However, the relay apparatus 1W is not connected to the relay apparatus 1P.

In a third embodiment illustrated in FIG. 9B, a relay apparatus is provided for each domain. Specifically, the working path WP1 in the network #1 is held in a relay apparatus 1W #1 and the working path WP2 in the network #2 is held in a relay apparatus 1W #2. The relay apparatus 1W #1 is connected to the relay apparatus 1W #2. Similarly, the protection path PP1 in the network #1 is held in a relay apparatus 1P #1 and the protection path PP2 in the network #2 is held in a relay apparatus 1P #2. The relay apparatus 1P #1 is connected to the relay apparatus 1P #2.

A configuration in a fourth embodiment illustrated in FIG. 9C is similar to that in the third embodiment illustrated in FIG. 9B. However, the relay apparatus 1W #1 and the relay apparatus 1P #1 at the network #1 side are connected to each other, and the relay apparatus 1W #2 and the relay apparatus 1P #2 at the network #2 side are connected to each other in the fourth embodiment. A bridge path BP #1 is set between the relay apparatus 1W #1 and the relay apparatus 1P #1, and a bridge path BP #2 is set between the relay apparatus 1W #2 and the relay apparatus 1P #2.

In the second to fourth embodiments, each relay apparatus may be realized with the configuration illustrated in FIG. 4. Examples in which the second to fourth embodiments are realized using the relay apparatus illustrated in FIG. 4 are described below.

Figure 10:
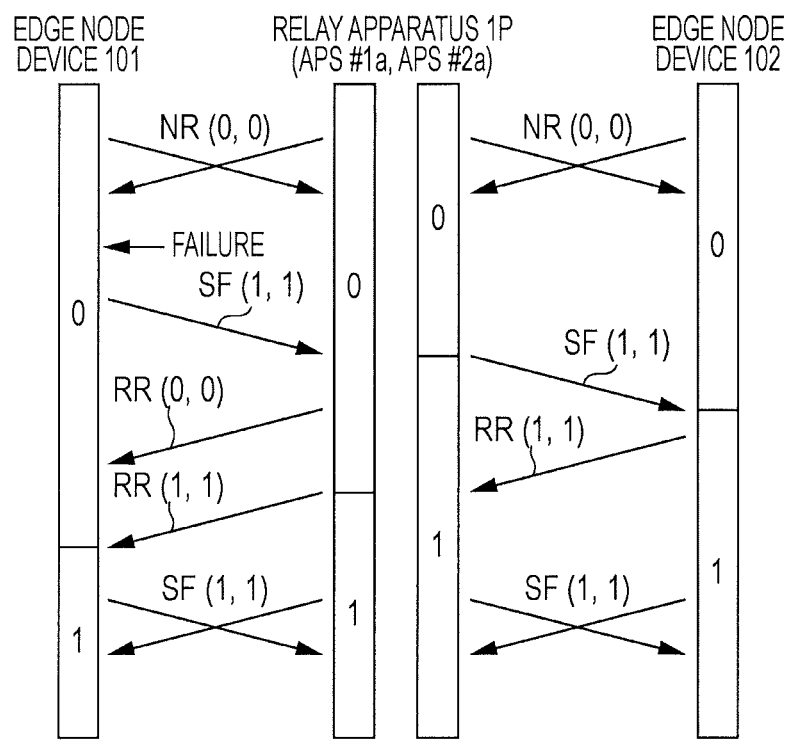
FIG. 10 illustrates an exemplary path switching sequence in a second embodiment.

Upon occurrence of a failure on the working path WP1 in the second embodiment illustrated in FIG. 9A, the redundancy is provided through an APS process illustrated in FIG. 10. Specifically, upon detection of the failure on the working path WP1, the edge node device 101 transmits the SF message to the relay apparatus 1P. In the relay apparatus 1P, the APS processor 16#1a receives the SF message transmitted from the edge node device 101. The APS processor 16#1a notifies the cooperation controller 17 of the reception of the SF message.

Figure 11:
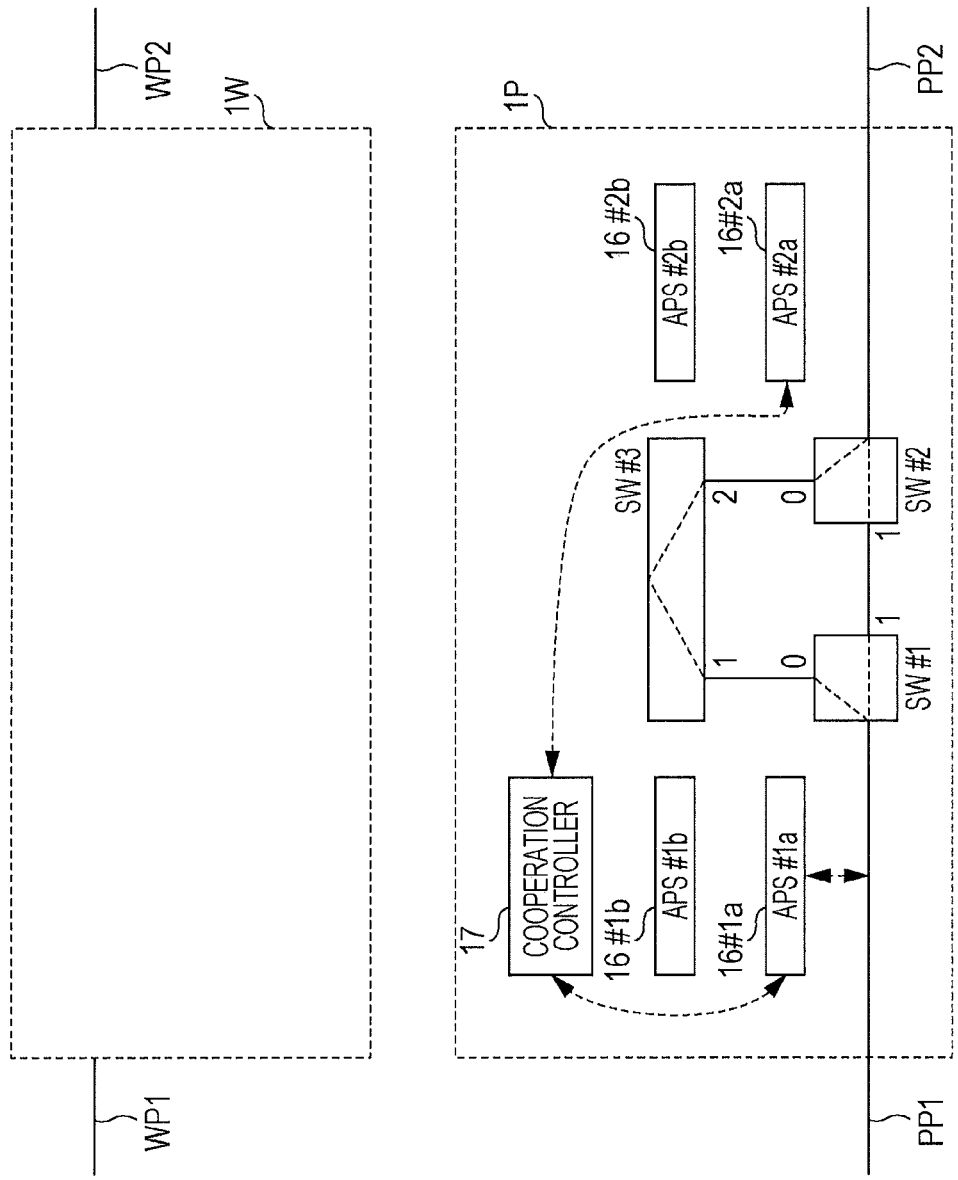
FIG. 11 illustrates an example of how the APS processors cooperate with each other in the second embodiment.

FIG. 11 illustrates an example of how the APS processors cooperate with each other in the second embodiment. In the second embodiment, the relay apparatus 1P is not connected to the relay apparatus 1W. In this case, the connection determiner 15 changes the settings of the switch SW #1 and the switch SW #2 in the switch circuit 14. Specifically, the switch SW #1 is set so as to connect the protection path PP1 to the switch SW #3 in the state 0 and so as to connect the protection path PP1 to the switch SW #2 in the state 1. Similarly, the switch SW #2 is set so as to connect the protection path PP2 to the switch SW #3 in the state 0 and so as to connect the protection path PP2 to the switch SW #1 in the state 1.

When the relay apparatus 1W is not connected to the relay apparatus 1P, the cooperation controller 17 causes the APS processor 16#1a and the APS processor 16#2a to cooperate with each other. Subsequently, the APS message received by the APS processor 16#1a via the protection path PP1 is transferred to the APS processor 16#2a and the APS message received by the APS processor 16#2a via the protection path PP2 is transferred to the APS processor 16#1a.

Referring back to FIG. 10, upon reception of the SF message from the APS processor 16#1a, the APS processor 16#2a switches the state of the switch SW #2 from "0" to "1". The APS processor 16#2a transmits the SF message to the edge node device 102.

The edge node device 102 switches the operation state of the edge node device 102 from "0" to "1" in response to the received SF message. The edge node device 102 transmits the RR message to the relay apparatus 1P. This RR message is received by the APS processor 16#2a and is passed to the APS processor 16#1a. The APS processor 16#1a switches the state of the switch SW #1 from "0" to "1" and transmits the RR message to the edge node device 101. The edge node device 101 switches the operation state of the edge node device 101 from "0" to "1" in response to the received RR message.

Figure 12A:
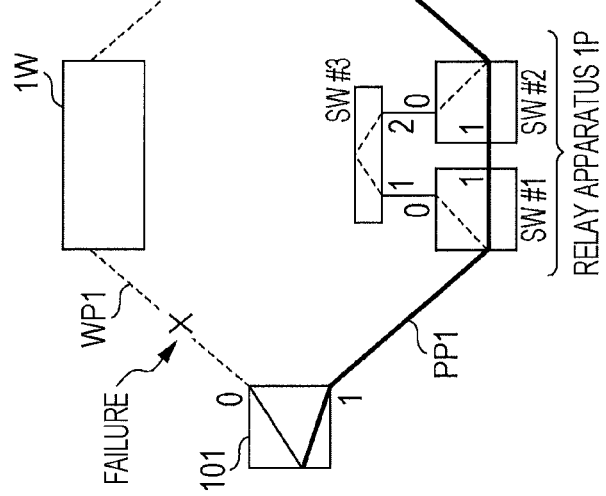
FIGS. 12A and 12B illustrate an example of the path switching in the second embodiment.
Figure 12B:
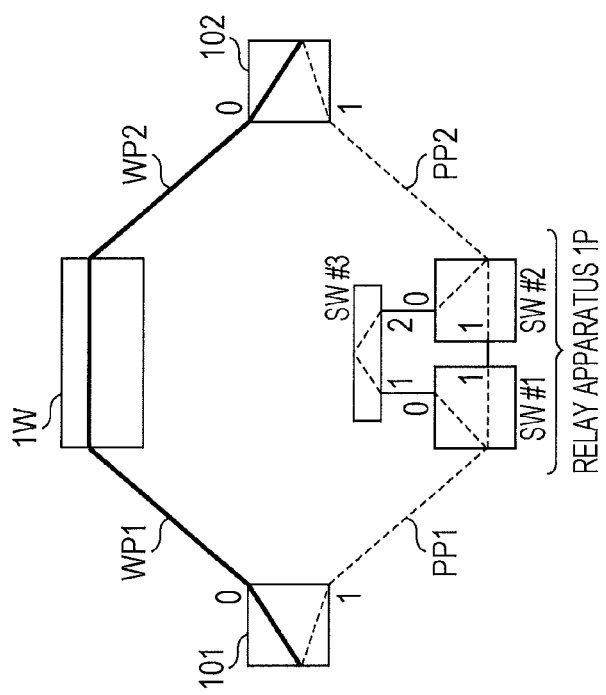

FIGS. 12A and 12B illustrate an example of how the traffic transmission route is switched using the redundancy path in the second embodiment. FIG. 12A illustrates the transmission route of the traffic when no failure occurs. When no failure occurs, the operation states of the edge node devices 101 and 102 are set to "0". In the relay apparatus 1P, the states of the switch SW #1 and the switch SW #2 are set to "0". In this case, the traffic between the edge node devices 101 and 102 is transmitted via the working path WP1 and the working path WP2.

FIG. 12B illustrates the transmission route of the traffic when a failure occurs on the working path WP1 in the network #1. Upon occurrence of the failure on the working path WP1, the states of the switch SW #1 and the switch SW #2 in the relay apparatus 1P are switched from "0" to "1" through the APS process described above with reference to FIG. 10 to FIG. 11. As a result, the traffic between the edge node devices 101 and 102 is transmitted via the protection path PP1 and the protection path PP2.

In the first embodiment in which the relay apparatus 1W is connected to the relay apparatus 1P, the traffic between the edge node devices 101 and 102 is transmitted via the protection path PP1, the bridge path BP, and the working path WP2, as illustrated in FIG. 7B. In contrast, in the second embodiment in which the relay apparatus 1W is not connected to the relay apparatus 1P, the traffic between the edge node devices 101 and 102 is transmitted via the protection path PP1 and the protection path PP2, as illustrated in FIG. 12B. However, as illustrated in FIG. 5 and FIG. 10, the APS process performed between the edge node device 101 and the relay apparatus 1P in the first embodiment is the same as that in the second embodiment. In other words, the edge node device (the edge node device 101 here) is capable of providing the redundancy through the two-phase APS process without recognizing the difference in the mounting mode of the relay apparatuses. Alternatively, in the network (the network #1 here) where a failure occurs, it is possible to provide the redundancy through the same two-phase APS process even in a different mounting mode of the relay apparatuses.

Figure 13:
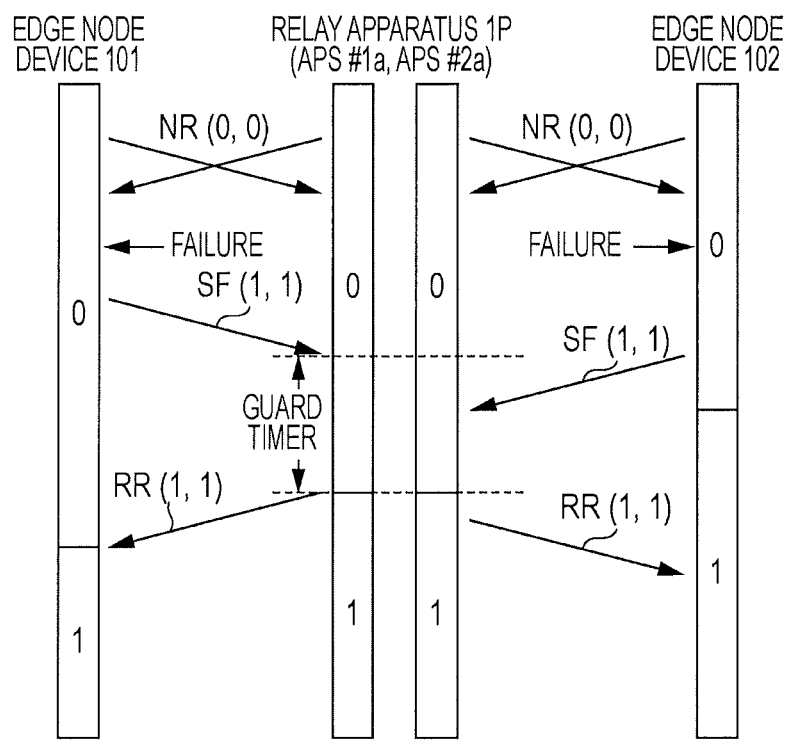
FIG. 13 illustrates an exemplary sequence to provide redundancy against a failure in a relay apparatus in a working system.

FIG. 13 illustrates an exemplary sequence to provide the redundancy against a failure in the relay apparatus in the working system. When the relay apparatus (that is, the relay apparatus 1W) in the working system fails, each of the edge node device 101 and the edge node device 102 detects the failure. In this case, each of the edge node device 101 and the edge node device 102 transmits the SF message to the relay apparatus 1P. However, the edge node device 101 transmits the SF message to the relay apparatus 1P independently of the transmission of the SF message by the edge node device 102. Accordingly, the time when the SF message from the edge node device 101 reaches the relay apparatus 1P may be different from the time when the SF message from the edge node device 102 reaches the relay apparatus 1P.

The APS processor in the relay apparatus 1P, which has received the SF message, starts a guard timer. In the example illustrated in FIG. 13, the APS processor 16#1a, which has first received the SF message, starts the guard timer. The APS processor 16#2a receives the SF message while the guard timer is operating. In this case, the cooperation controller 17 does not cause the APS processor 16#1a and the APS processor 16#2a to cooperate with each other. In other words, the APS processor 16#1a and the APS processor 16#2a independently perform the APS process.

Specifically, after switching the state of the switch SW #1 from "0" to "1", the APS processor 16#1a transmits the RR message to the edge node device 101. The edge node device 101 switches the operation state of the edge node device 101 from "0" to "1" in response to the received RR message. Similarly, after switching the state of the switch SW #2 from "0" to "1", the APS processor 16#2a transmits the RR message to the edge node device 102. The edge node device 102 switches the operation state of the edge node device 102 from "0" to "1" in response to the received RR message. As the result of the APS processes described above, the route is realized in the same manner as in FIG. 12B.

The sequence to provide the redundancy when the relay apparatus in the working system fails in the first embodiment is the same as that in the second embodiment. Specifically, in the first embodiment, upon reception of the SF messages from both of the edge node devices 101 and 102 during a certain period by the relay apparatus 1P, the cooperation controller 17 does not invoke the APS processor 16#1b and/or the APS processor 16#2b. Accordingly, also in this case, the working path WP1 is switched to the protection path PP1 through the APS process performed between the APS processor in the edge node device 101 and the APS processor 16#1a in the relay apparatus 1P and the working path WP2 is switched to the protection path PP2 through the APS process performed between the APS processor in the edge node device 102 and the APS processor 16#2a in the relay apparatus 1P.

Figure 14:
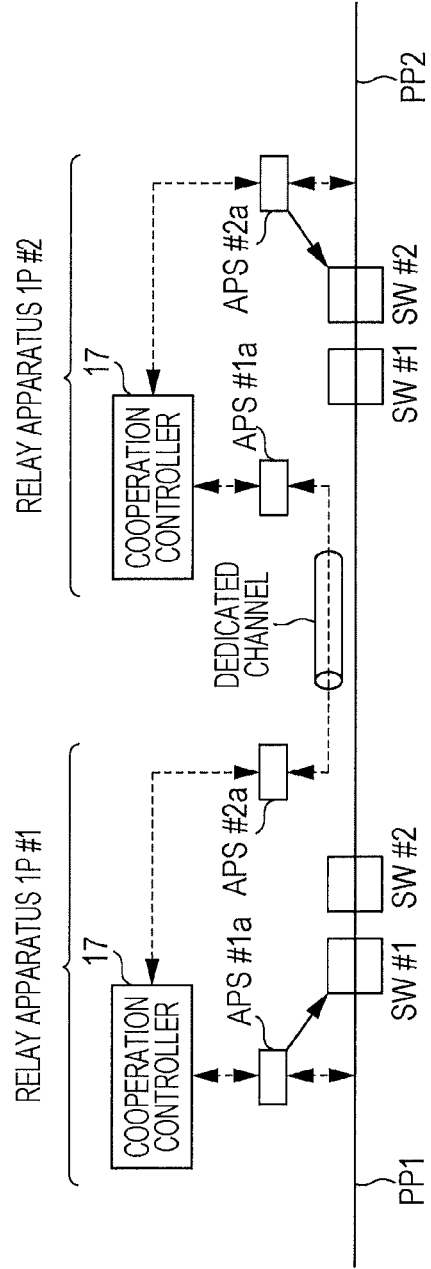
FIG. 14 illustrates an example of how the APS processors cooperate with each other in a third embodiment.

FIG. 14 illustrates an example of how the APS processors cooperate with each other in the third embodiment illustrated in FIG. 9B. In the third embodiment, upon transmission of the SF message from the edge node device 101 to the relay apparatus 1P #1 due to a failure on the working path WP1, the APS processor 16#1a notifies the cooperation controller 17 of the reception of the SF message. The cooperation controller 17 causes the APS processor 16#1a and the APS processor 16#2a to cooperate with each other, as in the second embodiment illustrated in FIG. 11. In the example in FIG. 14, a dedicated channel is set in advance between the APS processor 16#2a in the relay apparatus 1P #1 and the APS processor 16#1a in the relay apparatus 1P #2. The APS message is capable of being transmitted through the dedicated channel. Accordingly, the SF message received by the APS processor 16#1a in the relay apparatus 1P #1 is transferred to the APS processor 16#1a in the relay apparatus 1P #2 via the APS processor 16#2a in the relay apparatus 1P #1.

Also in the relay apparatus 1P #2, the cooperation controller 17 causes the APS processor 16#1a and the APS processor 16#2a to cooperate with each other, as in the second embodiment illustrated in FIG. 11. Accordingly, the above SF message is transferred to the APS processor 16#2a in the relay apparatus 1P #2. The APS processor 16#2a transmits the SF message to the edge node device 102. As a result, the operation state of the edge node device 102 is switched from "0" to "1".

In contrast, the RR message transmitted from the edge node device 102 is transferred to the APS processor 16#1a in the relay apparatus 1P #1 via the APS processor 16#2a in the relay apparatus 1P #2, the APS processor 16#1a in the relay apparatus 1P #2, and the APS processor 16#2a in the relay apparatus 1P #1. At this time, the APS processor 16#2a in the relay apparatus 1P #2 switches the state of the switch SW #2 in the relay apparatus 1P #2 from "0" to "1". The APS processor 16#1a in the relay apparatus 1P #1 switches the state of the switch SW #1 in the relay apparatus 1P #1 from "0" to "1". The states of the switch SW #2 in the relay apparatus 1P #1 and the switch SW #1 in the relay apparatus 1P #2 are fixed to "0".

In addition, the APS processor 16#1a in the relay apparatus 1P #1 transmits the RR message to the edge node device 101. As a result, the operation state of the edge node device 101 is switched from "0" to "1".

A method of providing the redundancy in the fourth embodiment illustrated in FIG. 9C is substantially the same as that in the first embodiment. Specifically, upon occurrence of a failure on the working path WP1 in FIG. 9C, the relay apparatus 1P #1 and the relay apparatus 1W #1 operate in the same manner as in the relay apparatus 1P and the relay apparatus 1W in the first embodiment to provide the redundancy. In this case, the relay apparatus 1P #2 and the relay apparatus 1W #2 do not perform the process caused by the failure. In contrast, upon occurrence of a failure on the working path WP2 in FIG. 9C, the relay apparatus 1P #2 and the relay apparatus 1W #2 operate in the same manner as in the relay apparatus 1P and the relay apparatus 1W in the first embodiment to provide the redundancy. In this case, the relay apparatus 1P #1 and the relay apparatus 1W #1 do not perform the process caused by the failure.

In the fourth embodiment, each of the relay apparatus 1P #1 and the relay apparatus 1W #1 may not include the APS processor 16#2b. Each of the relay apparatus 1P #2 and the relay apparatus 1W #2 may not include the APS processor 16#1b.

Figure 15:
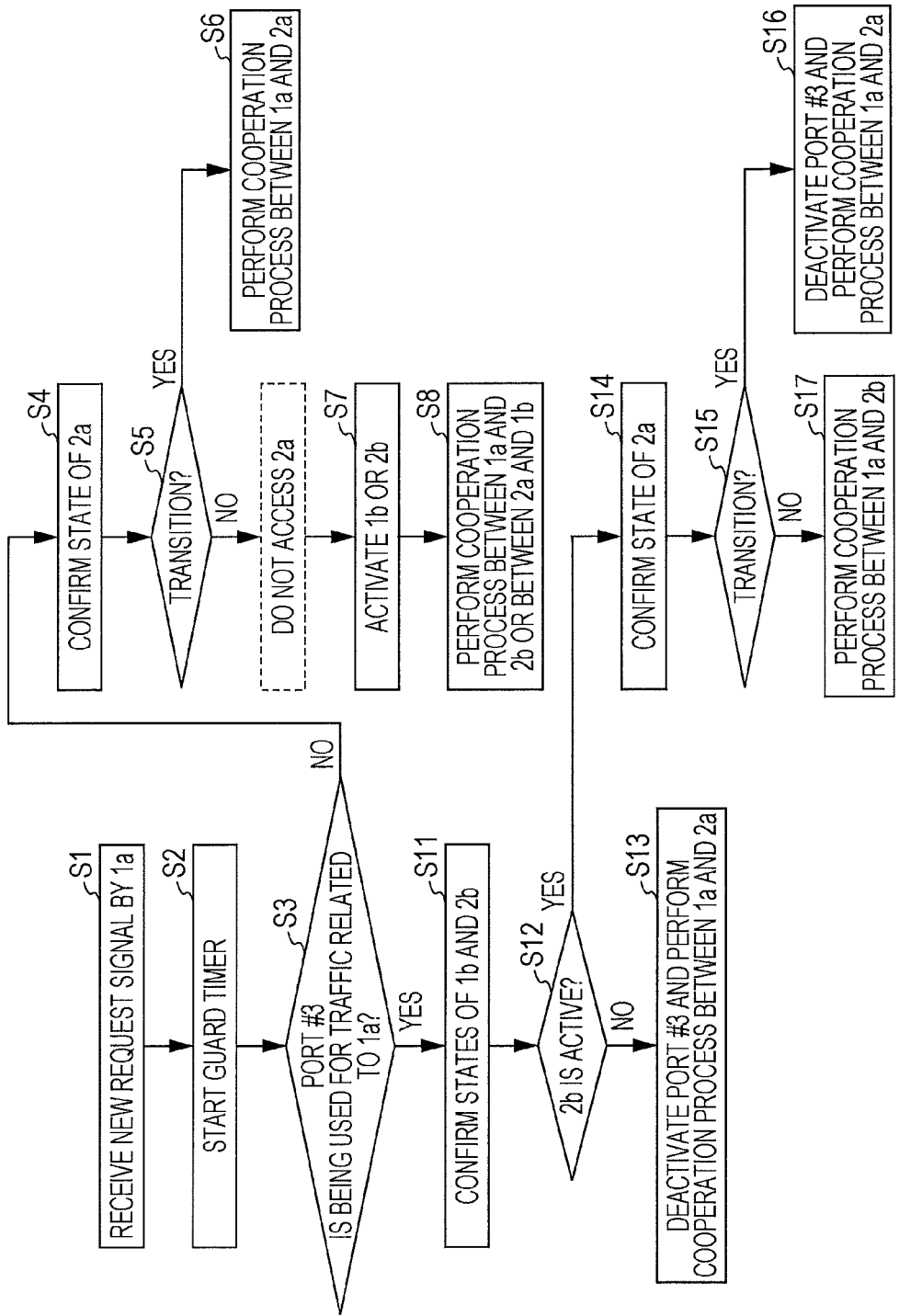
FIG. 15 is a flowchart illustrating an exemplary process performed by a cooperation controller.

FIG. 15 is a flowchart illustrating an exemplary process performed by the cooperation controller 17 provided in the relay apparatus 1P. The process performed when the APS processor 16#1a has received the APS message via the protection path PP1 is described here. In the flowchart illustrated in FIGS. 15, 1a, 2a, 1b, and 2b indicate the APS processor 16#1a, the APS processor 16#2a, the APS processor 16#1b, and the APS processor 16#2b, respectively.

Referring to FIG. 15, in operation 51, the cooperation controller 17 confirms that the APS processor 16#1a has received a new request signal. This request signal includes the APS messages (for example, the SF message) illustrated in FIG. 5, FIG. 8, FIG. 10, and FIG. 13. The cooperation controller 17 determines here that the transition of the operation state of the relay apparatus 1P is desirable. If the cooperation controller 17 determines that the transition of the operation state of the relay apparatus 1P is not desirable (for example, if the NR message is received), the process illustrated in FIG. 15 is terminated.

In operation S2, the cooperation controller 17 starts the guard timer. Alternatively, the APS processor 16#1a may start the guard timer and the cooperation controller 17 may monitor the guard timer. If the APS processor 16#2a receives a new request signal before the guard timer expired, the cooperation controller 17 does not perform the cooperation between the APS processes and the process illustrated in FIG. 15 is terminated. For example, if the relay apparatus 1W in the working system fails, as in the example illustrated in FIG. 13, each of the APS processor 16#1a and the APS processor 16#2a receives the SF message and, thus, the APS processor 16#1a and the APS processor 16#2a independently perform the APS process.

In operation S3, the cooperation controller 17 determines whether the traffic on the protection path PP1 is transmitted through a port #3. The port #3 holds the bridge path BP connected to the relay apparatus 1W in the working system.

If the traffic on the protection path PP1 is not transmitted through the port #3 (NO in operation S3), the process goes to operation S4.

In operation S4, the cooperation controller 17 confirms the state of the APS processor 16#2a. In operation S5, the cooperation controller 17 determines whether the transition of the state of the APS processor 16#2a is desirable. If the cooperation controller 17 determines that the transition of the state of the APS processor 16#2a is desirable (YES in operation S5), in operation S6, the cooperation controller 17 causes the APS processor 16#1a and the APS processor 16#2a to cooperate with each other. In the examples illustrated in FIG. 10 to FIGS. 12A and 12B, the cooperation controller 17 determines in operation S5 that the transition of the state of the APS processor 16#2a is desirable (YES in operation S5) and, in operation S6, the cooperation controller 17 causes the APS processor 16#1a and the APS processor 16#2a to cooperate with each other.

If the cooperation controller 17 determines that the transition of the state of the APS processor 16#2a is not desirable (NO in operation S5), the cooperation controller 17 does not access the APS processor 16#2a. In this case, in operation S7, the cooperation controller 17 activates the APS processor 16#1b or the APS processor 16#2b based on the operation state of the relay apparatus 1P and the received APS message. In operation S8, the cooperation controller 17 performs the cooperation with the APS processor activated in operation S7. For example, in the examples illustrated in FIG. 5 to FIGS. 7A and 7B, in operation S8, the cooperation controller 17 causes the APS processor 16#1a and the APS processor 16#2b to cooperate with each other. If only the working path WP1 is recovered after the failures have occurred on the working path WP1 and the working path WP2, the APS processor 16#1a receives the WTR message and, in operation S8, the cooperation controller 17 causes the APS processor 16#2a and the APS processor 16#1b to cooperate with each other.

If the traffic on the protection path PP1 is transmitted through the port #3 (YES in operation S3), the process goes to operation S11. In operation S11, the cooperation controller 17 confirms the states of the APS processor 16#1b and the APS processor 16#2b. In operation S12, the cooperation controller 17 determines whether the APS processor 16#2b is active. If the APS processor 16#1b is active (NO in operation S12), in operation S13, the cooperation controller 17 deactivates the port #3 and causes the APS processor 16#1a and the APS processor 16#2a to cooperate with each other. For example, it is assumed that, when the traffic between the edge node devices is transmitted via the working path WP1, the bridge path BP, and the protection path PP2 due to the failure on the working path WP2, a failure on the working path WP1 has further occurred. In this case, the cooperation controller 17 determines in operation S3 that the traffic on the protection path PP1 is transmitted through the port #3 (YES in operation S3) because the port #3 is being used and the cooperation controller 17 determines in operation S12 that the APS processor 16#2b is not active (NO in operation S12) because the APS processor 16#1b is operating. Accordingly, in operation S13, the cooperation controller 17 causes the APS processor 16#1a and the APS processor 16#2a to cooperate with each other.

If the cooperation controller 17 determines that the APS processor 16#2b is active (YES in operation S12), the process goes to operation S14. In operation S14, the cooperation controller 17 confirms the state of the APS processor 16#2a. In operation S15, the cooperation controller 17 determines whether the transition of the state of the APS processor 16#2a is desirable. If the cooperation controller 17 determines that the transition of the state of the APS processor 16#2a is desirable (YES in operation S15), in operation S16, the cooperation controller 17 deactivates the port #3 and causes the APS processor 16#1a and the APS processor 16#2a to cooperate with each other. If the cooperation controller 17 determines that the transition of the state of the APS processor 16#2a is not desirable (NO in operation S15), in operation S17, the cooperation controller 17 causes the APS processor 16#1a and the APS processor 16#2b to cooperate with each other. For example, in the example illustrated in FIG. 8, the failure on the working path WP1 has been recovered when the traffic between the edge node devices is transmitted via the protection path PP1, the bridge path BP, and the working path WP2 due to the failure on the working path WP1. In this case, the cooperation controller 17 determines in operation S3 that the traffic on the protection path PP1 is transmitted through the port #3 (YES in operation S3) because the port #3 is being used. The cooperation controller 17 determines in operation S12 that the APS processor 16#2b is active (YES in operation S12) because the APS processor 16#2b is operating. The cooperation controller 17 determines in operation S15 that the transition of the state of the APS processor 16#2a is not desirable (NO in operation S15) because the state of the APS processor 16#2a is not to be changed. Accordingly, in operation S17, the cooperation controller 17 causes the APS processor 16#1a and the APS processor 16#2b to cooperate with each other. However, the port #3 may be deactivated and/or the APS processor 16#2b may be stopped in operation S17.

Fifth Embodiment

Figure 16:
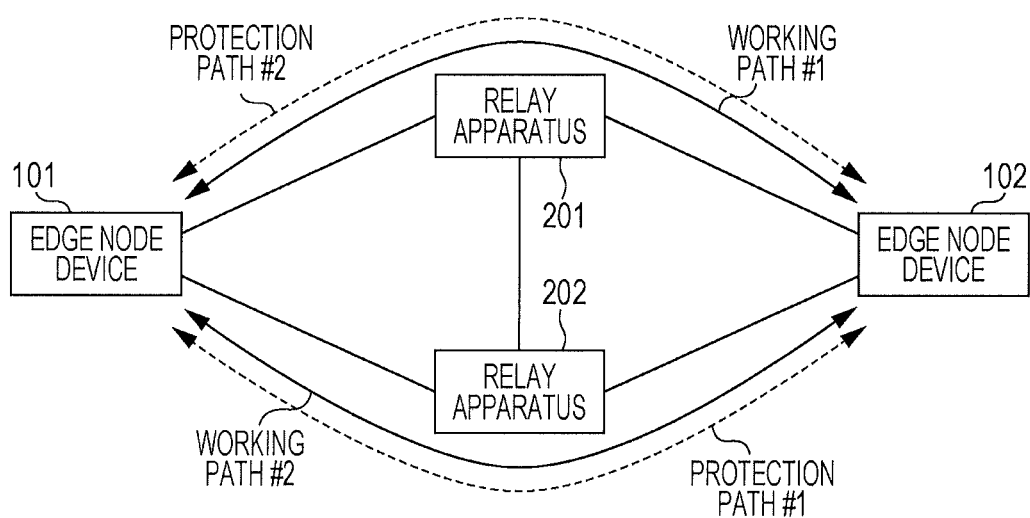
FIG. 16 illustrates an exemplary network system according to a fifth embodiment.

FIG. 16 illustrates an exemplary network system according to a fifth embodiment. In the network system of the fifth embodiment illustrated in FIG. 16, the redundancy is provided for every virtual LAN. For example, a working path #1 is set for a virtual LAN #1 via a relay apparatus 201 and a protection path #1 corresponding to the working path #1 is set for the virtual LAN #1 via a relay apparatus 202. A working path #2 is set for a virtual LAN #2 via the relay apparatus 202 and a protection path #2 corresponding to the working path #2 is set for the virtual LAN #2 via the relay apparatus 201. Each of the relay apparatuses 201 and 202 is realized by, for example, the configuration illustrated in FIG. 4.

The working path and the protection path in each virtual LAN are set so that the load is not concentrated on one relay apparatus. For example, the paths in each virtual LAN are set so that the number of the working paths relayed by the relay apparatus 201 is substantially equal to the number of the working paths relayed by the relay apparatus 202. Alternatively, the paths in each virtual LAN are set so that the total traffic relayed by the relay apparatus 201 is substantially equal to the total traffic relayed by the relay apparatus 202. In such a configuration, the load distribution in the entire network system is realized in normal operation.

Sixth Embodiment

Figure 17:
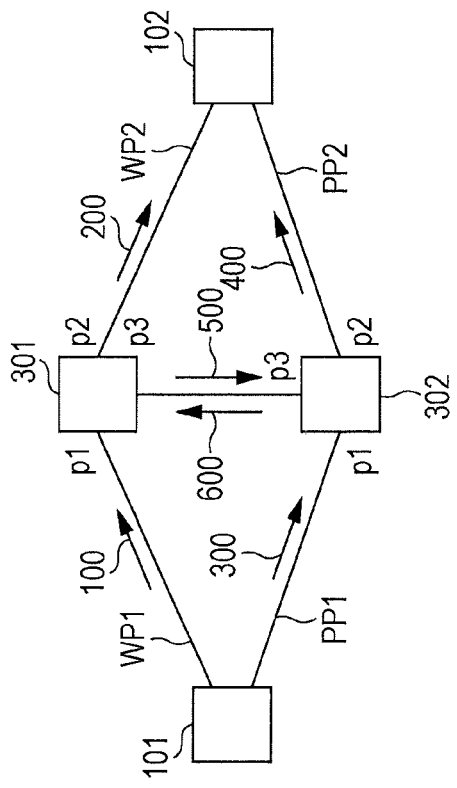
FIG. 17 includes a diagram illustrating an exemplary network system according to a sixth embodiment and label tables.

FIG. 17 includes a diagram illustrating an exemplary network system according to a sixth embodiment and label tables. In the sixth embodiment, the traffic between the edge node devices 101 and 102 is relayed by a relay apparatus 301 and a relay apparatus 302. Each of the relay apparatuses 301 and 302 includes three input-output ports p1 to p3.

In the sixth embodiment, each packet is transferred using a Label Switched Path (LSP) of Multi-Protocol Label Switching (MPLS). When the packets are transferred using the LSP, a label is added to each packet. The relay apparatus has a label table representing the correspondence between the labels and the ports. The relay apparatus identifies an output port based on the label of an input packet and outputs the packet through the identified output port. At this time, the relay apparatus rewrites the label added to the packet.

The label tables illustrated in FIG. 17 each indicate the labels for the traffic from the edge node device 101 to the edge node device 102. In the label tables, "Working" indicates a state in which the packet from the edge node device 101 to the edge node device 102 is transmitted via the working path WP1, the relay apparatus 301, and the working path WP2. "Redundancy 1" indicates a state in which the packet is transmitted via the working path WP1, the relay apparatus 301, the relay apparatus 302, and the protection path PP2. "Redundancy 2" indicates a state in which the packet is transmitted via the protection path PP1, the relay apparatus 302, the relay apparatus 301, and the working path WP2. "Redundancy 3" indicates a state in which the packet is transmitted via the protection path PP1, the relay apparatus 302, and the protection path PP2.

The relay apparatuses 301 and 302 control the operation state (Working, Redundancy 1, Redundancy 2, or Redundancy 3) of the network system through the APS process. Then, the relay apparatuses 301 and 302 perform labeling in accordance with the operation state. For example, it is assumed that the operation state of the network system is "Redundancy 2". In this case, the edge node device 101 adds a "label: 300" to the packet and transmits the packet having the "label: 300" added thereto to the relay apparatus 302. The relay apparatus 302 rewrites the label of the packet from "300" to "600" and outputs the packet through the port p3. In other words, the packet is transmitted to the relay apparatus 301. The relay apparatus 301 rewrites the label of the packet from "600" to "200" and outputs the packet through the port p2. In other words, the packet is transferred to the edge node device 102.

Each of the relay apparatuses 301 and 302 is realized by, for example, the configuration illustrated in FIG. 4. However, when the packets are transmitted using the LSP of the MPLS, each of the relay apparatuses 301 and 302 has the label table. In addition, circuits to perform the labeling are provided, instead of the multiplexer-demultiplexer 12#1, the multiplexer-demultiplexer 12#2, and the multiplexer-demultiplexer 12#3. Upon determination of the operation state using the flowchart illustrated in FIG. 15, the labeling is performed in accordance with the result of the determination.

Seventh Embodiment

Figure 18:
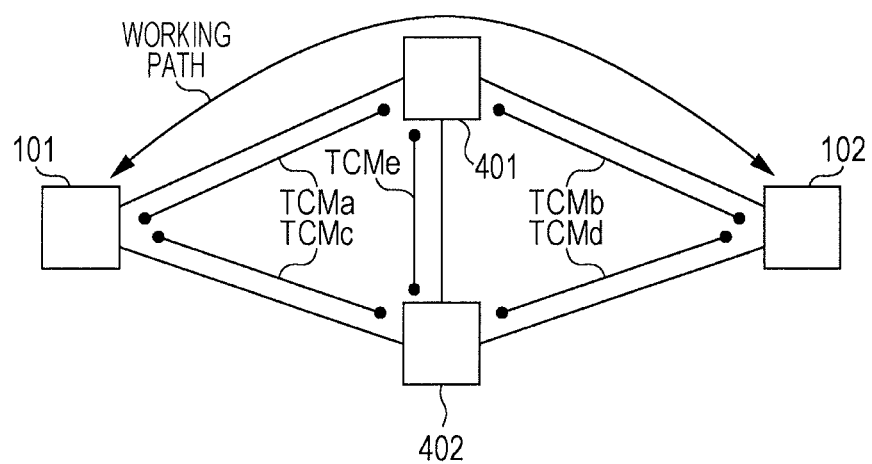
FIG. 18 illustrates an exemplary network system according to a seventh embodiment.

FIG. 18 illustrates an exemplary network system according to a seventh embodiment. In the seventh embodiment, the traffic between the edge node devices 101 and 102 is relayed by a relay apparatus 401 and a relay apparatus 402. The working path is set using the relay apparatus 401 and the protection path is set using the relay apparatus 402.

In the seventh embodiment, data is transmitted using Optical Transport Network (OTN). In the OTN, the path is capable of being monitored using Tandem Connection Monitoring (TCM). In the seventh embodiment, TCMa to TCMe are set, as illustrated in FIG. 18. Here, an Optical channel Data Unit (ODU) frame is capable of setting six TCMs (TCM1 to TCM6) for the APS, as defined in ITU-T G. 709.

For example, the TCM1 is set for the TCMc and the TCM2 and the TCM3 are set for the TCMe between the relay apparatuses 401 and 402. In this case, the TCM2 is set for the APS processor 16#1b and the TCM3 is set for the APS processor 16#2b. Specifically, the TCM1 is associated with the TCM3 when the cooperation between the APS processor 16#1a, which processes the APS message received from the line #1 illustrated in FIG. 4 and the APS message to be transmitted to the line #1, and the APS processor 16#2b, which processes the APS message received from the line #3 and the APS message to be transmitted to the line #3, is performed. The TCM1 is associated with the TCM2 when the cooperation between the APS processor 16#2a, which processes the APS message received from the line #2 illustrated in FIG. 4 and the APS message to be transmitted to the line #2, and the APS processor 16#1b, which processes the APS message received from the line #3 and the APS message to be transmitted to the line #3, is performed. At this time, the inserting-extracting units 13#1 to 13#3 selectively use the TCM2 or the TCM3 set for the TCMe.

Each of the relay apparatuses 401 and 402 is realized by, for example, the configuration illustrated in FIG. 4. However, when data is transmitted using the OTN, the multiplexer-demultiplexer 12#1, the multiplexer-demultiplexer 12#2, and the multiplexer-demultiplexer 12#3 multiplex and demultiplex the ODU frame.

Eighth Embodiment

Figure 19A:
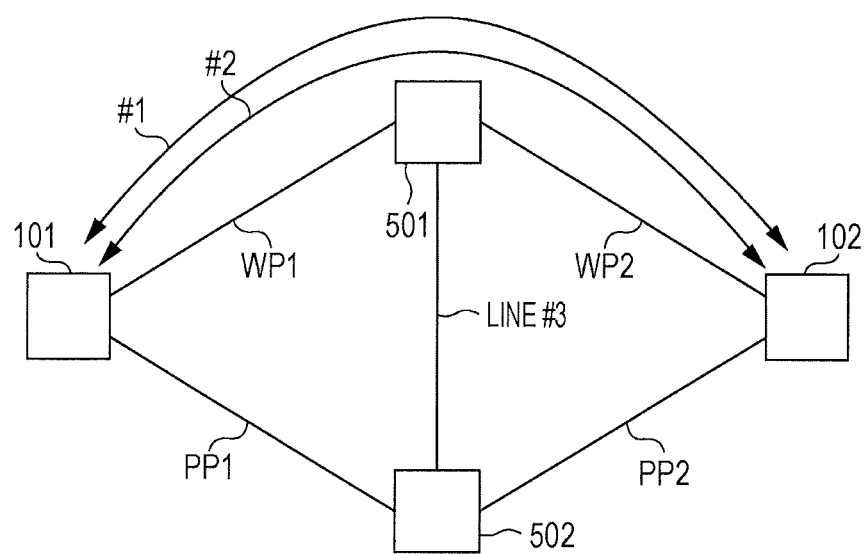
FIGS. 19A and 19B illustrate an exemplary network system according to an eighth embodiment.
Figure 19B:
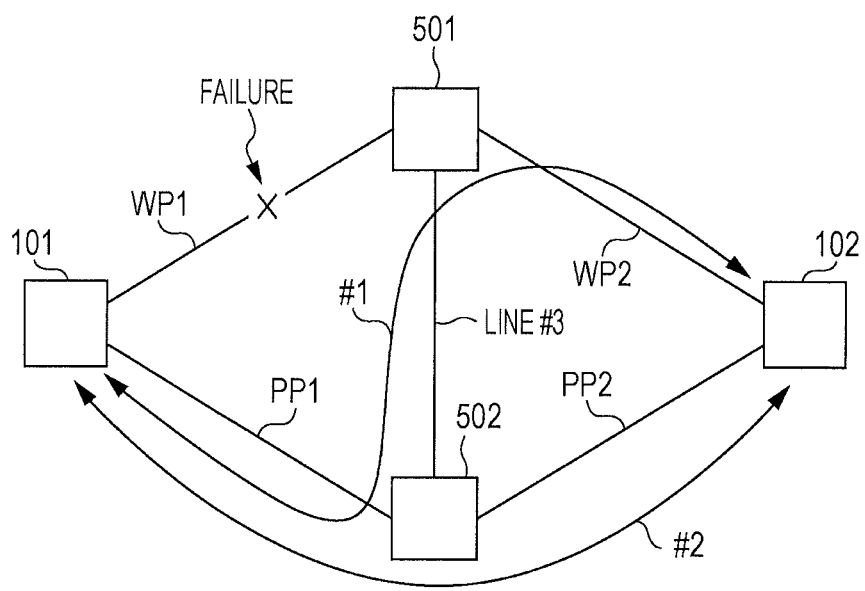

FIGS. 19A and 19B illustrate an exemplary network system according to an eighth embodiment. In the eighth embodiment, the traffic between the edge node devices 101 and 102 is relayed by a relay apparatus 501 and a relay apparatus 502. However, both traffic #1 and traffic #2 are relayed by the relay apparatus 501 in the normal operation, as illustrated in FIG. 19A.

If a failure occurs on the working path WP1, for example, the redundancy illustrated in FIG. 7B is provided. However, when the bandwidth of the line #3 between the relay apparatuses 501 and 502 is narrow, all the traffics are not transmitted using the line #3. In other words, when the sum of the traffic #1 and the traffic #2 exceeds the bandwidth of the line #3, part of the traffics (the traffic #1 here) is transmitted via the line #3 and the remaining traffic (the traffic #2 here) is transmitted via the protection path PP2, as illustrated in FIG. 19B.

In this example, the distance at which the APS message is transmitted and the path switching time in the process in which the redundancy is provided between the edge node device 101 and the relay apparatuses 501 and 502 are expected to be shorter than those in the process in which the redundancy is provided between the edge node devices 101 and 102. Accordingly, the redundancy using the relay apparatuses 501 and 502 may be provided for the traffics having higher priorities and the redundancy between the edge node devices 101 and 102 may be provided for the traffics having lower priorities.

Each of the relay apparatuses 501 and 502 is realized by, for example, the configuration illustrated in FIG. 4. The priority of each traffic is set, for example, in the relay apparatuses 501 and 502 in advance. Alternatively, the priority may be set for each virtual LAN using a Class of Service (CoS) value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A protection transmission apparatus, comprising:
    a switch circuit configured to hold a first protection path provided for a working path in a first network, a second protection path provided for the working path in a second network, and a bridge path provided between a working transmission apparatus to relay traffic on the working path between the first network and the second network and the protection transmission apparatus to relay traffic on the first protection path and the second protection path; and
    a signal processing unit configured to,
        upon reception of a first control signal indicating a failure on the working path from the first network, transmit the first control signal to the working transmission apparatus and control the switch circuit in accordance with a second control signal corresponding to the first control signal, and
        control the switch circuit in accordance with the second control signal to connect the first protection path to the bridge path,
    wherein the protection transmission apparatus is provided on a boundary between the first network and the second network in a network system including the working transmission apparatus and the protection transmission apparatus.

2. A protection transmission apparatus provided on a boundary between first and second networks in a network system including a working transmission apparatus and the protection transmission apparatus, comprising:
    a switch circuit configured to hold a first protection path provided for a working path in the first network, a second protection path provided for the working path in the second network, and a bridge path provided between the working transmission apparatus to relay traffic on the working path between the first network and the second network and the protection transmission apparatus to relay traffic on the first protection path and the second protection path; and
    a signal processing unit configured to, upon reception of a first control signal indicating a failure on the working path from the first network, transmit the first control signal to the working transmission apparatus and control the switch circuit in accordance with a second control signal corresponding to the first control signal, the signal processing unit including
        a first signal processor configured to process a first automatic protection switching (APS) signal to be transmitted on the first protection path;
        a second signal processor configured to process a second APS signal to be transmitted on the second protection path;
        a third signal processor configured to process a third APS signal to be transmitted on the bridge path; and
        a cooperation controller configured to control cooperation among the first signal processor, the second signal processor, and the third signal processor, and
    wherein, when the first signal processor receives the first control signal from the first network, the cooperation controller causes the first signal processor and the third signal processor to cooperate with each other.

3. The protection transmission apparatus according to claim 2, wherein, when the first signal processor receives the first control signal from the first network and the second signal processor receives a third control signal indicating a failure on the working path from the second network, the cooperation controller causes the first signal processor to process the first control signal and causes the second signal processor to process the third control signal.

4. The protection transmission apparatus according to claim 2,
    further comprising a determining unit configured to determine a state of the bridge path,
    wherein, when the determining unit determines that the bridge path is set, the cooperation controller causes the first signal processor and the third signal processor to cooperate with each other, and
    wherein, when the determining unit determines that the bridge path is not set, the cooperation controller causes the first signal processor and the second signal processor to cooperate with each other.

* * * * *